(12) United States Patent
Tayano et al.

(10) Patent No.: US 7,390,575 B2
(45) Date of Patent: Jun. 24, 2008

(54) PROPYLENE-ETHYLENE RANDOM BLOCK COPOLYMER AND BIAXIALLY ORIENTED MULTI-LAYER FILM USING THE SAME AS A SURFACE LAYER

(75) Inventors: Takao Tayano, Mie (JP); Kuninori Takahashi, Mie (JP); Iku Kouzai, Mie (JP); Shinichi Kitade, Mie (JP); Shigeo Mizukami, Mie (JP); Koichi Hirayama, Mie (JP)

(73) Assignee: Japan Polypropylene Corporation, Tokyo (JP)

( * ) Notice: Subject to any disclaimer, the term of this patent is extended or adjusted under 35 U.S.C. 154(b) by 472 days.

(21) Appl. No.: 10/965,826

(22) Filed: Oct. 18, 2004

(65) Prior Publication Data

US 2005/0113517 A1    May 26, 2005

(30) Foreign Application Priority Data

Oct. 31, 2003  (JP)  .............................. 2003-371458
Apr. 20, 2004  (JP)  .............................. 2004-124498

(51) Int. Cl.
  *B32B 27/08*  (2006.01)
  *C08F 10/00*  (2006.01)
  *C08L 9/00*  (2006.01)

(52) U.S. Cl. ........................ 428/515; 428/516; 428/910; 526/348.1; 525/84

(58) Field of Classification Search ................ 428/515, 428/516, 910; 526/348.1; 525/84
See application file for complete search history.

(56) References Cited

U.S. PATENT DOCUMENTS

| | | | | |
|---|---|---|---|---|
| 5,623,022 | A * | 4/1997 | Sugano et al. | 525/247 |
| 6,469,100 | B2 * | 10/2002 | Suzuki et al. | 525/88 |
| 6,531,552 | B2 * | 3/2003 | Nakano et al. | 526/127 |
| 6,624,253 | B2 * | 9/2003 | Nakamura et al. | 525/240 |
| 6,677,411 | B2 * | 1/2004 | Uchino et al. | 526/127 |
| 6,825,280 | B1 * | 11/2004 | Hayakawa et al. | 525/240 |
| 6,875,485 | B2 * | 4/2005 | Kanai et al. | 428/34.1 |
| 7,189,790 | B2 * | 3/2007 | Iwama et al. | 526/160 |
| 2001/0014719 | A1 * | 8/2001 | Suzuki et al. | 525/323 |
| 2002/0004447 | A1 * | 1/2002 | Nakano et al. | 502/81 |
| 2002/0041972 | A1 * | 4/2002 | Nakamura et al. | 428/516 |
| 2002/0064611 | A1 * | 5/2002 | Kanai et al. | 428/34.1 |
| 2003/0027950 | A1 * | 2/2003 | Uchino et al. | 526/90 |
| 2005/0070426 | A1 * | 3/2005 | Iwama et al. | 502/117 |
| 2005/0113517 | A1 * | 5/2005 | Tayano et al. | 525/191 |

FOREIGN PATENT DOCUMENTS

| | | |
|---|---|---|
| EP | 1 106 644 A1 | 6/2001 |
| EP | 1 454 931 A1 | 9/2004 |
| JP | 63-159412 | 7/1988 |
| JP | 63-168414 | 7/1988 |
| JP | 8-238729 | 9/1996 |
| JP | 08-244182 * | 9/1996 |
| JP | 9-227757 | 9/1997 |
| JP | 9-239925 | 9/1997 |
| JP | 2000-239462 | 9/2000 |
| JP | 2001-59028 | 3/2001 |
| JP | 2001-64335 | 3/2001 |
| JP | 3358441 | 10/2002 |
| JP | 2003-55510 | 2/2003 |
| JP | 2003-170555 | 6/2003 |
| WO | WO 98/10016 | 3/1998 |
| WO | WO 98/39284 | 9/1998 |
| WO | WO 98/39384 | 9/1998 |
| WO | WO 02/070572 A2 | 9/2002 |
| WO | WO 03/106523 A1 | 12/2003 |

OTHER PUBLICATIONS

Patent Abstracts of Japan, JP 08-244182, Sep. 24, 1996.

* cited by examiner

*Primary Examiner*—Sheeba Ahmed
(74) *Attorney, Agent, or Firm*—Oblon, Spivak, McClelland, Maier & Neustadt, P.C.

(57) ABSTRACT

A polyolefin based biaxially oriented multi-layer film having at least one surface layer comprise of the propylene-ethylene random block copolymer;

The propylene-ethylene random block copolymer obtained through sequential polymerization catalyzed by a metallocene component which is composed of 30 to 70 wt % of a propylene-ethylene random copolymer component having an ethylene content of 1 to 7 wt % produced in the first step of the polymerization and from 70 to 30 wt % of a low crystallinity or an amorphous propylene-ethylene random copolymer component produced in the second step of the polymerization having an ethylene content of 6 to 15 wt % higher than that of the polymer component obtained in the first step, wherein that shows a single peak at 0° C. or lower in the temperature-loss tangent (tan δ) curve obtained by dynamic mechanical analysis (DMA).

13 Claims, 3 Drawing Sheets

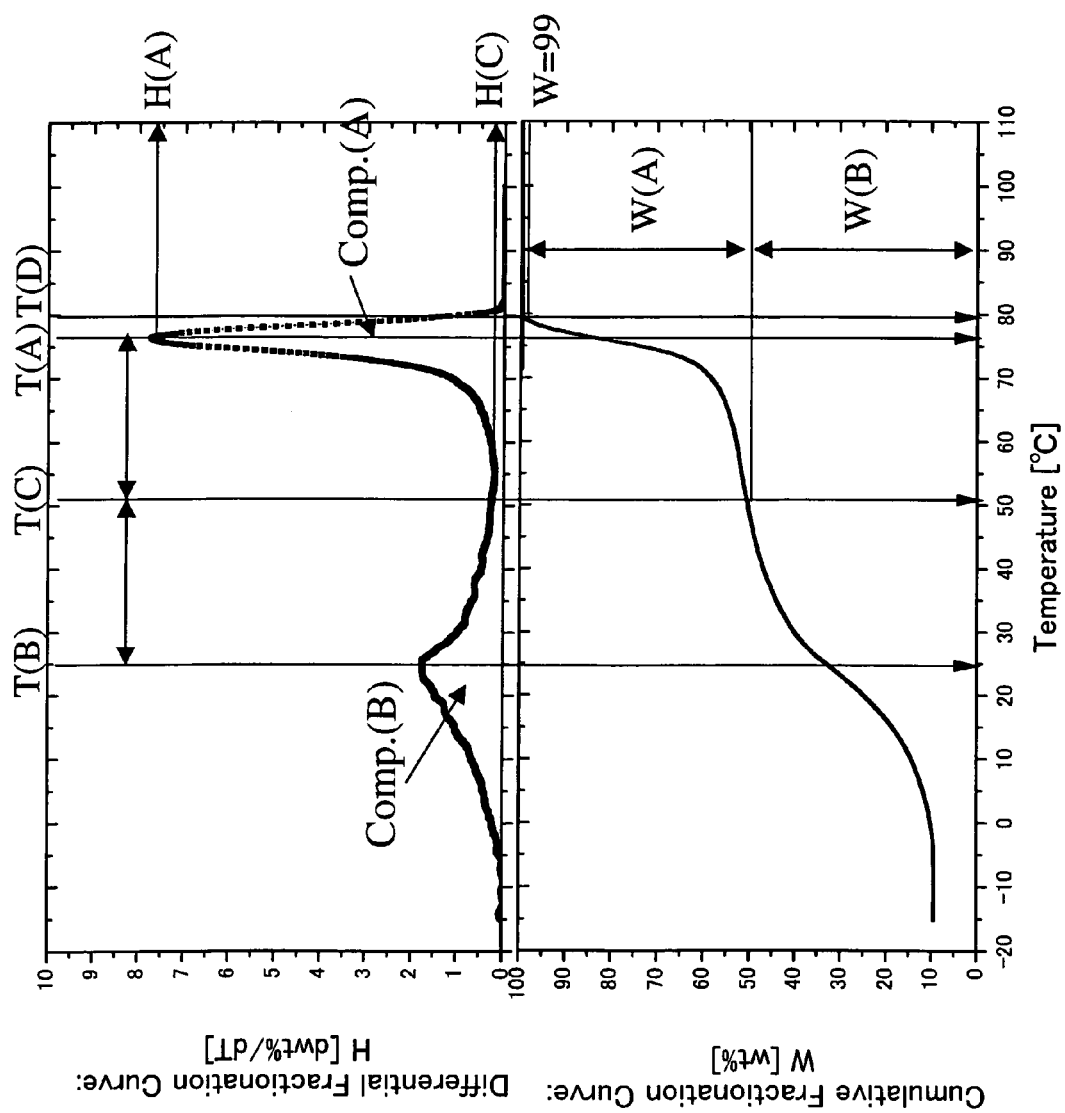
Fig.1. TREF Curve (Ex.1)

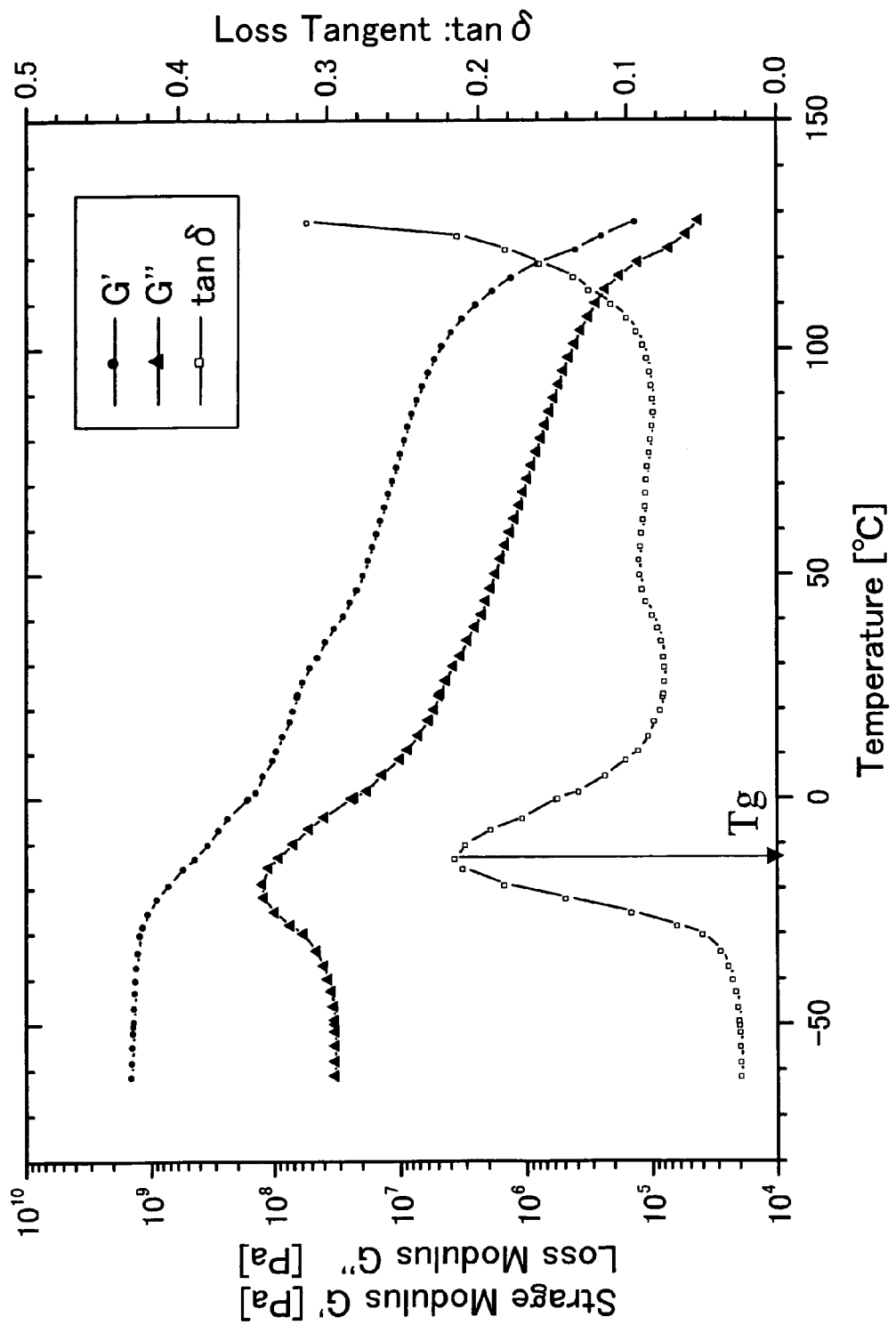
Fig.2.DMA result(Ex.1)

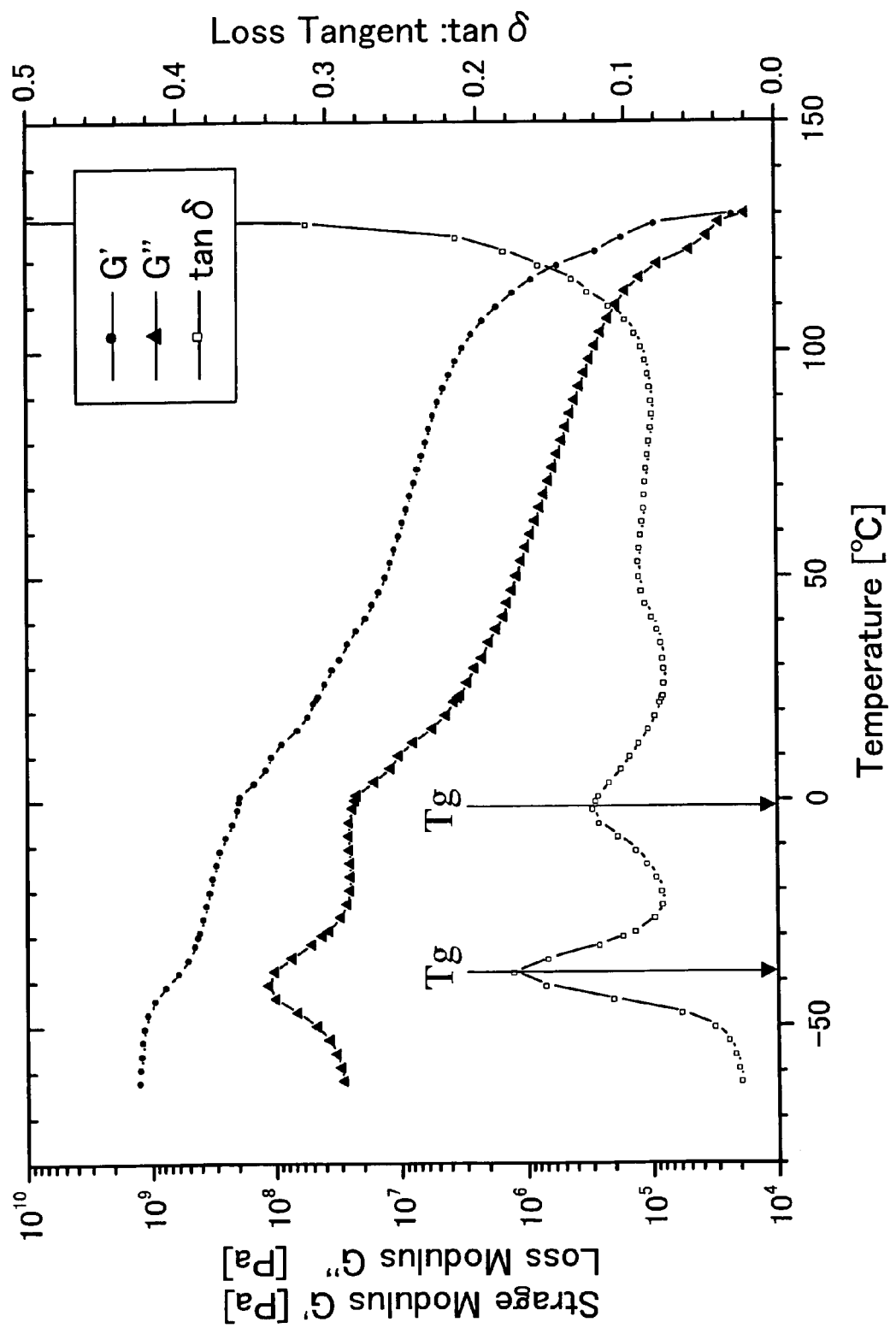

PROPYLENE-ETHYLENE RANDOM BLOCK COPOLYMER AND BIAXIALLY ORIENTED MULTI-LAYER FILM USING THE SAME AS A SURFACE LAYER

FIELD OF THE INVENTION

The present invention relates to a propylene-ethylene random block copolymer and a biaxially oriented multi-layer film obtained by using the propylene-ethylene random block copolymer as a surface layer. Particularly, the present invention relates to a novel propylene-ethylene random block copolymer having a specific crystallinity distribution, which have improved transparency and flexibility, no tackiness of product, suppressed bleed-out, excellent processability, particularly at a low temperature. And also this invention is a heat sealable polypropylene based biaxially oriented multi-layer film obtained by using said copolymer as a surface layer, which is excellent in heat sealing strength and has low temperature heat sealing property, transparency, and anti-blocking property in a good balance.

DISCUSSION OF BACKGROUND

An polyolefin based thermoplastic elastomer or plastomer is a polymer composite of such as a random copolymer represented by ethylene-α-olefin copolymer, and has been widely used in industry such fields as films, sheets, fibers, non-woven fabrics, various containers or molded products, and modifiers because of it's appropriate flexibility and strength, also low environmental load in respect of recycling or burning disposal, and further satisfactory light weight, processability and economic efficiency.

Among these thermoplastic elastomers, a reactor TPO obtained through sequential polymerization that composed of a crystalline polypropylene produced in the first step and a propylene-ethylene copolymer elastomer produced in the second step (such propylene based polymer is generally referred to as "block copolymer") has the advantages of heat resistance and productivity as compared with a random copolymer elastomer, and of the abilities to provide a product having a stable quality in the wide range of it's compositions at a low production cost as compared with an elastomer composite produced by mechanically mixing. Accordingly, this reactor TPO has high economic efficiency and excellent heat resistance and strength, and is recently widely used.

However, many of them have defects that their transparency is remarkably poor and their flexibility is not enough, because a crystalline polypropylene produced in the first step and a propylene-ethylene copolymer elastomer produced in the second step are immiscible and show a phase-separated structure.

Under these circumstances, a polyolefin based elastomer or plastomer having excellent transparency and flexibility is advantageous for industrial uses, and therefore various improvements have been made heretofore.

For example, in order to improve flexibility and transparency, there is a proposal of sequential polymerization by a Ziegler-Natta catalyst, which comprises a pair of steps, in the first step, a polypropylene or propylene-ethylene copolymer containing small amount of ethylene is prepared, and in the second step, a propylene-ethylene copolymer elastomer containing relatively low but higher than that of the polymer component obtained in the first step (see Patent Publication Documents 1 and 2). However, since a Ziegler-Natta catalyst has various kinds of active sites, the propylene-ethylene random copolymer thus produced has broad composition distribution and broad molecular weight distribution. And such a polymer contains a considerable amount of low crystallinity and/or low molecular weight components. Accordingly, such products obtained thereof are sticky and poor in bleed-out (leaching of low molecular weight component or additives), and have defects of easily causing problems such as blocking or poor appearance.

In order to solve this problem, a modification of the former method is proposed that an intrinsic viscosity (i.e. a molecular weight) of an elastomer is increased higher than a certain level to suppress the formation of a low molecular weight component (see Patent Publication Document 3). However, even when the molecular weight is increased, the formation of a low crystalline component is not efficiently suppressed and transparency is not sufficient and stickiness or bleed-out problems are not sufficiently improved. Further, the higher molecular weight elastomer causes a poor appearance due to the presence of grains (generally called fisheyes (FE) or the like), and a poor processability, which need an addition of an organic peroxide for rheology control.

Thereafter, a reactor TPO obtained by a metallocene catalyst has been developed. For example, a propylene based copolymer having a specific elution pattern in temperature rising elution fractionation (TREF) was obtained by the sequential polymerization that a polypropylene was prepared in the first step and a copolymer of propylene and ethylene and/or a $C_4$-$C_{18}$ α-olefin was prepared in the second step. This copolymer showed no tackiness as an improved feature because of narrow composition distributions and narrow molecular weight distribution (see Patent Publication Documents 4 and 5).

Particularly, in order to solve the above-mentioned problems, Patent Publication Document 4 disclosed a propylene based polymer composition comprising a polypropylene component and a propylene-ethylene copolymer component, being satisfied with requirements that a component eluted under 90° C. is from 50 to 99 wt % to the total components, a component eluted above 90° C. is from 50 to 1 wt %, and a component eluted under 0° C. is at most 10 wt % in a temperature rising elution fractionation using o-dichlorobenzene solvent.

However, the propylene based polymer composition obtained by this method had a high melting temperature and was not suitable for processing at low temperature, particularly calendaring, and also had a problem that heat resistance remarkably declined in the case of the specific composition for highly improved flexibility.

Also, Patent Publication Document 5 discloses a composition containing large amount of the eluted fraction under 0° C. in TREF by increasing an ethylene content in the second step.

This composition had excellent flexibility but poor heat resistance. And this composition took a phase-separated structure, so there were various problems of a poor transparency evaluated by a total light transmittance although a haze value is not high, and of a poor appearance due to flow mark.

By the way, a polyolefin film is excellent in physical properties, transparency, processability, economical efficiency and low environmental load, and is accordingly widely used as a packaging material in various fields mainly for foods, daily necessaries, pharmaceuticals, miscellaneous goods and the like.

Further, various functions are required in packaging material, so many kinds of films are used, such as an oriented film being excellent in strength and stiffness, a heat shrinkable film for adhesive packaging, a gas barrier film for storing, a retort film for boiling sterilization and so on.

Among these various functions, one of the most important function is a heat sealing property for a polyolefin film as a packaging material.

Mechanical properties such as strength and stiffness of a polyolefin film are enhanced by orientation.

But, a crystalline polypropylene oriented film has poor heat sealing properties. For example, heat sealable temperature is high, heat sealable temperature range is narrow, heat sealing strength is not enough, a slippery property and an anti-blocking property are poor, and packaging operatability is not satisfactory.

To solve these problems, a polypropylene based oriented multi-layer film having a surface layer with good heat sealing properties is proposed.

But a conventional heat sealing material such as low density polyethylene is poor in transparency and anti-blocking property, and a propylene-ethylene random copolymer containing very low amount of ethylene is poor in low temperature heat sealing property although transparency and anti-blocking property are satisfactory.

When an ethylene content is increased in propylene-ethylene random copolymer, its low temperature heat sealing property is improved, but anti-blocking property becomes poor. Even by using a copolymer of propylene and butane-1, slippery property, anti-blocking property, and packaging operatability is not satisfactory, or heat sealing strength is not satisfactory although low temperature heat sealing property is improved (see Patent Publication Document 6).

A multi-layer film having a surface layer using a composition of propylene-ethylene random block copolymer and polyolefin is improved in heat sealing property, slippery property and tearing property (see Patent Publication Document 7), a co-extruded multi-layer film improved in heat sealing property and slippery property by using a composition of propylene-ethylene random block copolymer having different ethylene contents as a surface layer (see Patent Publication Document 8), a co-extruded multi-layer film improved in heat sealing property by using a propylene-ethylene block copolymer having an elution component specified by temperature rising elution fractionation method (see Patent Publication Document 9), a multi-layer film improved in heat sealing property and impact strength by using a propylene-α-olefin block copolymer as a surface layer (see Patent Publication Document 10), a multi-layer film improved in heat sealing property, anti-blocking property and stiffness by using a composition of propylene based polymer and propylene-α-olefin random copolymer as a surface layer (see Patent Publication Document 11), and a co-extruded multi-layer film improved in heat sealing strength by improving thickness accuracy of a biaxially oriented base layer by using a composition of propylene homopolymer and propylene-ethylene random copolymer as a base layer and a propylene-α-olefin copolymer as a surface layer (see Patent Publication Document 12).

However, even these improving techniques do not satisfy following all of the properties at the same time, i.e., heat sealing strength, low temperature heat sealing property, transparency, slippery property and anti-blocking property.

Patent Publication Document 1: JP-A-63-159412 (Claims, page 2, right lower column)

Patent Publication Document 2: JP-A-63-168414 (Claims, page 2, right lower column)

Patent Publication Document 3: Japanese Patent No. 3358441 (Claim 1)

Patent Publication Document 4: JP-A-2000-239462 (Abstract)

Patent Publication Document 5: JP-A-2001-64335 (Abstract)

Patent Publication Document 6: JP-A-8-238729 (Claim 1, paragraphs 0001, 0003 and 0005 to 0013)

Patent Publication Document 7: JP-A-9-227757 (Abstract, Claim 1)

Patent Publication Document 8: JP-A-9-239925 (Abstract)

Patent Publication Document 9: JP-A-2000-239462 (Abstract, Claim 1, Claim 6 and Claim 7)

Patent Publication Document 10: JP-A-2001-59028 (Abstract, Claim 4)

Patent Publication Document 11: JP-A-2003-55510 (Abstract)

Patent Publication Document 12: JP-A-2003-170555 (Abstract, Claim 1, paragraph 0004)

As described above, the main object of the present invention is to develop an industrially useful polyolefin elastomer or plastomer material by improving transparency, flexibility and heat resistance.

Further, the present invention is directed to a propylene-ethylene random block copolymer useful as a material excellent in processability, which suppresses stickiness and bleed-out so as not to cause a poor appearance due to FE.

Still further, in view of the prior art discussed above, another object of the present invention is to propose a polyolefin based biaxially oriented multi-layer film which has excellent performance in following all the properties, heat sealing strength, low temperature heat sealing property, transparency, anti-blocking property and slippery property.

In order to obtain a novel random block copolymer, the present inventors have discovered that important requirements are to select a kind of catalyst and a specific polymerization method, to specify crystallinities both of a high crystalline component and a low crystalline or an amorphous component in the copolymer and to specify their composition.

In detail, the present inventors have discovered that important factors for preparing the above-mentioned novel and excellent propylene-ethylene random block copolymer are to employ a metallocene catalyst, to employ sequential (multi-step) polymerization of a block copolymer as a polymerization method, to be composed of a specific crystalline propylene-ethylene random copolymer component having a narrow crystallinity distribution and a specific low crystalline or a specific amorphous propylene-ethylene random copolymer component in a specific amount.

Furthermore, in the present invention the extremely flexible and transparent random block copolymer can be obtained keeping an adequate heat resistance, by increasing ethylene content in crystalline component in the first step instead of increasing an amount of low crystalline or amorphous component in the second step too much.

On the other hand, the present inventors apply the specified propylene-ethylene random block copolymer as a surface layer of the film to improve above-mentioned properties, i.e., heat sealing strength, low temperature heat sealing property, transparency, appearance, anti-blocking property and slippery property. In order to improve these properties, it is recognized that these properties are closely related to polymerization method, composition of respective components, comonomer content of each component, molecular weight, molecular weight distribution, miscibility of respective components, and crystallinities. The present invention has been conceived on the basis of this discovery.

For example, in order to obtain a high heat sealing strength, it is important that the surface layer has an appropriate flexibility, which mainly depends on a composition of respective components and an comonomer content of the random block copolymer. On the other hand, in order to improve transparency, low temperature heat sealing property and anti-blocking property, it is an important that the random block copolymer is made by a specific polymerization method with a specific kind of catalyst in the preparation and that obtained random block copolymer has a specific crystallinity and a specific composition. Precisely speaking, the transparency depends on miscibility of the random block copolymer, in other words, depends on the crystallinity (comonomer content) and molecular weight of two components of the random block copolymer. The heat sealing property and anti-blocking property depend on a crystallinity, molecular weight, molecular weight distribution, a composition of respective components and a comonomer content.

On the basis of the above-mentioned consideration and experimental analyses, the present invention basically employs the propylene-ethylene random block copolymer having specific characteristics obtained by sequential polymerization employing a metallocene catalyst as a surface layer of the polyolefin based biaxially oriented multi-layered film. The random block copolymer is obtained through sequential polymerization which is composed of 30 to 70 wt % of a propylene-ethylene random copolymer component having an ethylene content of 1 to 7 wt % in the first step and 70 to 30 wt % of a low crystalline or an amorphous propylene-ethylene random copolymer component in the second step having an ethylene content of 6 to 15 wt % higher than that of the polymer component obtained in the first step. Further, in order to specify miscibility which is deeply related to transparency, temperature-loss tangent (tan δ) curve obtained by Dynamic Mechanical Analysis (DMA) is employed. When this tan δ curve shows a single peak at 0° C. or lower, the propylene-ethylene random block copolymer is miscible and a film obtained therefrom is highly transparent.

JP-A-8-244182 discloses a multi-layer film excellent in peeling property and in tear property, which has surface layer comprising a propylene based block copolymer having Mw/Mn range of 1 to 4 and being composed of two component 1 to 70 wt % of component(A) and 30 to 99 wt % of component(B), where component(A) is polypropylene or propylene based random copolymer having at least 90 mol % propylene content and component(B) is propylene-ethylene random copolymer having 10 to 40 mol % ethylene content.

However, this technique is directed to improve peeling property and tear property only, and to obtain high heat sealing strength, it is necessary to employ significantly large amount of a propylene-ethylene random copolymer component(B). In such a case, there is a problem that it is necessary to employ a relatively large amount of additives for keeping anti-blocking property. Further, to obtain sufficient heat sealing strength, there is a problem that it is necessary to increase a thickness of a surface layer extremely, however this method is generally undesirable from an economical point of view.

The present invention partly overlaps with this prior art with respect to a composition of components in a propylene-ethylene random block copolymer, however the present invention focuses on improving not peeling property and tear property but heat sealing strength, low temperature heat sealing property, transparency, anti-blocking property and slippery property. To achieve these purposes, this invention specifies not only the composition and comonomer contents of the random block copolymer but also a kind of a catalyst and a polymerization method. Moreover, this invention specifies loss tangent properties closely related mainly to transparency. Thus, it is clear that the present invention is substantially different from this prior art technique.

SUMMARY OF THE INVENTION

The whole constitution of the present invention is described hereinafter and the present invention includes the following features. The invention illustrated in the following embodiment 1) is the basic invention, and the embodiment 2) and succeeding embodiments include additional features and depend on the basic invention.

1) A polyolefin based biaxially oriented multi-layer film having at least one surface layer comprising of the propylene-ethylene random block copolymer;

the propylene-ethylene random block copolymer obtained through sequential polymerization catalyzed by a metallocene component, which is composed of 30 to 70 wt % of a propylene-ethylene random copolymer component having an ethylene content of 1 to 7 wt % produced in the first step of the sequential polymerization and 70 to 30 wt % of a low crystalline or an amorphous propylene-ethylene random copolymer component produced in the second step of the sequential polymerization having an ethylene content of 6 to 15 wt % higher than that of the polymer component obtained in the first step, wherein the propylene-ethylene random block copolymer shows a single peak at 0° C. or lower in the temperature-loss tangent (tan δ) curve obtained by dynamic mechanical analysis (DMA).

2) The polyolefin based biaxially oriented multi-layer film according to embodiment 1), wherein the base layer is composed of crystalline propylene based polymer or that compositions.

3) The polyolefin based biaxially oriented multi-layer film according to embodiment 1), wherein the surface layer is comprised of 100 parts by weight of the propylene-ethylene random block copolymer and from 5 to 45 parts by weight of a crystalline butene-1 based polymer or propylene-butene-1 copolymer.

4) The polyolefin based biaxially oriented multi-layer film according to embodiment 1), wherein the propylene-ethylene random block copolymer satisfies the following condition (i):

(i) in a temperature-differential fractionation (dwt %/dT) curve obtained by a temperature rising elution fractionation (TREF) using an o-dichlorobenzene solvent in a temperature range of −15 to 140° C., a peak temperature T(A) is observed within a range of 65 to 96° C. and a peak temperature T(B) is observed within a range of at most 45° C. or a peak T(B) is not observed, and a temperature T(D) at which 99 wt % of total amount of block copolymer is eluted is at most 98° C., and a temperature difference T(D)-T(A) is at most 5° C.

5) The polyolefin based biaxially oriented multi-layer film according to embodiment 4), wherein T(A) is within a range of 65 to 88° C., T(B) is within a range of at most 40° C. or T(B) is not observed, and T(D) is at most 90° C.

6) The polyolefin based biaxially oriented multi-layer film according to embodiment 4), wherein the propylene-ethylene random block copolymer satisfies the following condition (ii):

(ii) a H(C)/H(A) ratio of an elution height H(C) at T(C) (={T(A)+T(B)}/2 is the middle temperature of the peak temperature T(A) and the peak temperature T(B) (when T(B) is not observed in a measurement temperature range, T(B) is defined as −15° C. which is the lower limit of measurement temperature)) to an elution height H(A) at T(A) is at most 0.1 in the temperature-differential fractionation curve obtained by TREF.

7) The polyolefin based biaxially oriented multi-layer film according to embodiment 4), wherein the propylene-ethylene random block copolymer satisfies the following condition (iii):
   (iii) a weight average molecular weight (Mw) measured by gel permeation chromatography (GPC) is in a range of 100,000 to 400,000, and W(M≦5000) which is defined as an amount of a component having a molecular weight less than 5,000 in GPC is at most 0.8 wt % to the total propylene-ethylene random block copolymer amount.
8) A propylene-ethylene random block copolymer obtained through sequential polymerization catalyzed by a metallocene component, which comprises a crystalline propylene-ethylene random copolymer component(A) that shows a peak at temperature T(A) in a range of 65 to 88° C. and a low crystalline or an amorphous propylene-ethylene random copolymer component(B) that shows a peak at temperature T(B) in a range of at most 40° C. or does not show a peak in a temperature-differential fractionation (dwt %/dT) curve obtained by a temperature rising elution fractionation (TREF) using an o-dichlorobenzene solvent in a temperature range of −15 to 140° C. And the propylene-ethylene random block copolymer satisfying the following conditions (iv) to (vi):
   (iv) A cumulative elution amount W(B) eluted below a middle temperature T(C) (={T(A)+T(B)}/2) of the peak temperature T(A) and the peak temperature T(B) (when T(B) is not observed in a measurement temperature range, T(B) is defined as −15° C. which is the lower limit of measurement temperature) in a temperature-differential fractionation curve obtained by TREF is from 30 to 70 wt %, and a cumulative elution amount W(A) eluted above T(C) is from 70 to 30 wt %,
   (v) a temperature T(D) at which 99 wt % of total amount of block copolymer is eluted in TREF is at most 90° C., and
   (vi) in a temperature-loss tangent (tan δ) curve obtained by dynamic mechanical Analysis (DMA) shows a single peak at 0° C. or lower.
9) The propylene-ethylene random block copolymer according to embodiment 8), wherein the propylene-ethylene random block copolymer satisfies the following condition (vii):
   (vii) a H(C)/H(A) ratio is at most 0.1 in temperature-differential fractionation curve obtained by TREF.
10) The propylene-ethylene random block copolymer according to embodiment 8), wherein the propylene-ethylene random block copolymer satisfies the following condition (viii):
    (viii) a weight average molecular weight (Mw) measured by gel permeation chromatography (GPC) is in a range of 100,000 to 400,000, and W(M<5000) which is defined as an amount of a component having a molecular weight less than 5,000 in GPC is at most 0.8 wt % to the total propylene-ethylene random block copolymer amount.
11) The propylene-ethylene random block copolymer according to embodiment 8), wherein the propylene-ethylene random block copolymer satisfies the following condition (ix):
    (ix) a cold xylene solubility at 23° C. has an intrinsic viscosity [η]cxs measured in decalin at 135° C. in a range of 1 to 2 dl/g.
12) The propylene-ethylene random block copolymer according to embodiment 8), wherein the propylene-ethylene random block copolymer satisfies the following condition (x):
    (x) a melting temperature (Tm) obtained by differential scanning calorimeter (DSC) is in a range of 105 to 140° C.
13) The propylene-ethylene random block copolymer according to embodiment 8), wherein [E]gap (=[E]B−[E]A) which is the difference between an ethylene content [E]B in a low crystalline or an amorphous propylene-ethylene random copolymer component(B) and an ethylene content [E]A in a crystalline propylene-ethylene random copolymer component(A) is in a range of 6 to 15 wt %.

The propylene-ethylene random block copolymer of the present invention has improved transparency and flexibility, no stickiness of product, suppressed bleed-out, excellent processability, particularly at a low temperature. Thus, the propylene-ethylene random block copolymer of the present invention is an industrially useful high molecular elastomer materials as a film, a sheet and a laminated material, or a covering material for various containers.

And also this invention is a heat-sealable polypropylene based biaxially oriented multi-layer film obtained by using said copolymer as a surface layer, which is excellent in heat sealing strength and has low temperature heat sealing property, transparency, and anti-blocking property in a good balance.

BRIEF DESCRIPTION OF THE DRAWINGS

FIG. 1 illustrates a temperature-fractionation curve in TREF of Example 1.

FIG. 2 illustrates a temperature-loss tangent curve in dynamic mechanical analysis of Example 1.

FIG. 3 illustrates a temperature-loss tangent curve in dynamic mechanical analysis of Comparative Example 5.

DETAILED DESCRIPTION OF THE PREFERRED EMBODIMENTS

Hereinafter, in order to explain the present invention in more details, the embodiments of the present invention are more concretely described.

The propylene-ethylene random block copolymer of the present invention is obtained through sequential polymerization catalyzed by a metallocene component and is composed of a crystalline propylene-ethylene random copolymer component(A) (hereinafter referred to as "component(A)") and a low crystalline or an amorphous propylene-ethylene random copolymer component(B) (hereinafter referred to as "component(B)").

The biaxially oriented multi-layer film of the present invention is composed of a base layer comprising a polyolefin, particularly a crystalline propylene based polymer or that polymer composition, and a surface layer comprising the specific propylene-ethylene random block copolymer on at least one side of the film. And this film is remarkably excellent as a packaging material.

1. With Regard to Base Layer

For a base layer of the biaxially oriented multi-layer film of the present invention, a polyolefin can be used and preference is a crystalline propylene based polymer.

(1) Crystalline Polyolefin Based Polymer (Essential Component)

A crystalline polyolefin based polymer used as the base layer of the biaxially oriented multi-layer film of the present invention is a propylene homopolymer or a propylene based random, block or graft copolymer containing α-olefin (such as ethylene, butene, hexene, 4-methylpentene or octene), an unsaturated carboxylic acid or its derivative (such as acrylic acid or maleic anhydride) or an aromatic vinyl monomer (such as styrene) at most 50 wt %.

A melt flow rate (MFR) of a crystalline polyolefin based polymer is preferably from 0.5 to 10 g/10 min., particularly from 1 to 5 g/10 min., in view of processability.

(2) Other Polymers and Additives (Optional Component)

The base layer of the biaxially oriented multi-layer film of the present invention may comprise a crystalline polyolefin based polymer as the main component, which may be blended with other polymers and additives in such a range as not to lower its properties, for example, in an amount of at most 30 wt %. Examples of such polymers additives include hydrocarbon polymers (or their hydrogenated materials) such as petroleum resin, terpene resin or styrene resin, and other thermoplastic polymers. Further, the crystalline polyolefin based polymer of the base layer may contain a stabilizer such as an antioxidant or a UV stabilizer, a pigment, an antistatic agent, a lubricant, an anti-blocking agent, and other additives.

2. With Regard to Surface Layer

The biaxially oriented multi-layer film of the present invention having a surface layer on one side or both sides of a base layer comprising of the above crystalline polyolefin based polymer, and the surface layer is composed of a specific propylene-ethylene random block copolymer as defined below.

The propylene-ethylene random block copolymer is obtained through sequential polymerization catalyzed by a metallocene component and is composed of a crystalline propylene-ethylene random copolymer component(A) and a low crystalline or an amorphous propylene-ethylene random copolymer component(B).

(1) Definition of Propylene-ethylene Random Block Copolymer

The propylene-ethylene random block copolymer in the present invention is obtained through sequential polymerization catalyzed by a metallocene component, which is composed of 30 to 70 wt % of a propylene-ethylene random copolymer component having an ethylene content of 1 to 7 wt % produced in the first step of the polymerization and 70 to 30 wt % of a low crystalline or an amorphous propylene-ethylene random copolymer component produced in the second step of the polymerization having an ethylene content of 6 to 15 wt % higher than that of the polymer component obtained in the first step.

(1-1) Ethylene Content [E]A in Component(A)

An ethylene content in component(A) ranges from 1 to 7 wt %, preferably from 2 to 6 wt %. When the ethylene content is lower than 1 wt %, a melting point of a random block copolymer obtained therefrom becomes higher and consequently a heat sealable temperature becomes undesirably high. When the ethylene content exceeds 7 wt %, crystallinity of a surface layer becomes too low, and anti-blocking property of a film becomes undesirably poor.

(1-2) Ethylene Content [E]B in Component(B)

An ethylene content of component(B) is defined by a difference from an ethylene content of component(A), i.e. [E]B−[E]A ([E]gap). It is necessary that [E]gap is in a range of 6 to 15 wt %, preferably 7 to 13 wt %, more preferably 8 to 12 wt %.

Component(B) is an important component that makes block copolymer flexible and enhances heat sealing strength.

When [E]gap is lower than the above-mentioned range, flexibility and strength is not improved satisfactorily and heat resistance becomes poor because component(A) and component(B) are co-crystallized that make melting point lower.

On the other hand, when [E]gap exceeds the above-mentioned range as miscibility of component(A) and component(B) becomes poor, they takes a phase-separated structure.

In this case, as refractive index of matrix and domain are different and the domain size is sufficient to a visible light wavelength, which cause light scattering, and transparency of a film becomes poor.

Also, since the peeling at the interface between matrix and domain occurs easily, heat sealing strength is not improved.

(1-3) Proportion W(A) of Component(A) and Proportion W(B) of Component(B) in Random Block Copolymer Since flexibility of a random block copolymer is improved by increasing a proportion of component (B), the proportion W(B) of component(B) to the total random block copolymer is required to be at least 30 wt %, preferably at least 40 wt %, in order to achieve a satisfactory flexibility for improving heat sealing property.

When W(B) is less than 30 wt %, a satisfactory flexibility cannot be achieved and heat sealing strength is not improved without lowering a crystallinity of component(A). In such a case, the melting temperature become too low and consequently heat resistance become poor and anti-blocking property of a film become unsatisfactory.

On the other hand, when W(B) is too high, anti-blocking property becomes poor and therefore W(B) must be at most 70 wt %, preferably at most 65 wt %.

Consequently, it is required that W(B) is in a range of 30 to 70 wt %, more preferably 40 to 65 wt %. Also, W(A) is required to be in a range of 70 to 30 wt %, more preferably 60 to 35 wt %.

(1-4) Definition by Peak in the Temperature-loss Tangent (tan δ) Curve

In the present invention, it is necessary for maintaining transparency of a film that a propylene-ethylene random block copolymer used as a surface layer does not take a phase-separated structure, but phase separation conditions include not only an ethylene content of each component but also a molecular weight or a composition of two components.

Therefore, in addition to the above limitation of ethylene content, it is essential to define a peak of loss tangent (tan δ) in temperature-tan δ curve obtained by dynamic mechanical analysis (DMA).

When the propylene-ethylene random block copolymer takes a phase-separated structure, a glass transition temperature of component(A) and component(B) are different, so multiple peaks are observed in temperature-loss tangent(tan δ) curve.

On the other hand, when component(A) and component(B) are miscible, a single peak is observed.

Thus, it is necessary for maintaining a high transparency of a film to show a single peak in tan δ curve.

And the peak temperature is at most 0° C., preferably at most −5° C., more preferably at most −10° C. in order to keep an impact resistance at low temperature.

FIG. 1 illustrates an example (Production Example 1) of having a single peak in tan δ curve at a temperature below 0° C. and FIG. 2 illustrates an example (Production Example 10) of having multiple peaks in tan δ curve.

DMA is carried out by imposing a sinusoidal strain of a specific frequency to a strip-like test piece and by detecting the stress thus caused. The measurement is carried out by using a frequency of 1 Hz and by raising a measurement temperature step-wise from −60° C. until a sample is melted so that the measurement becomes impossible. The amplitude of the strain is recommended to be about from 0.1 to 0.5%. Storage modulus and loss modulus were determined from the stress thus obtained in accordance with well-known method, and loss tangent (=loss modulus/storage modulus) is plotted to a temperature as illustrated in FIG. 1. Generally, the peak of tan δ curve at 0° C. or lower indicates glass transition of an amorphous phase, and the present peak temperature is defined as a glass transition temperature Tg (unit: ° C.).

(1-5) Specification of [E]A and [E]B ,and W(A) and W(B)

Respective ethylene contents and amounts of component(A) and component(B) can be specified by a material balance of polymerization, but in order to specify them more accurately, it is preferable to employ the following analysis.

(1-5-1) Specification of Respective Amounts W(A) and W(B) by Temperature Rising Elution Fractionation (TREF)

TREF is well known for the evaluation method for crystallinity distribution of a propylene-ethylene random copolymer to those skilled in the art, measuring methods of which are fully described in the following Documents.

G. Glockner, *J. Appl. Polym. Sci.: Appl. Polym. Symp.* 45, 1-24 (1990)

L. Wild, *Adv. Polym. Sci.* 98, 1-47 (1990)

J. B. P. Soares, A. E. Hamielec, *Polymer* 36, 1639-1654 (1995)

Respective crystallinities of component(A) and component(B) of the propylene-ethylene random block copolymer of the present invention are largely different. And since it is produced by using a metallocene catalyst, respective crystallinity distributions become narrow and an amount of a component intermediate between the two components is quite small. Consequently it is possible to accurately estimate W(A) and W(B) by TREF.

In TREF elution curve (plot of an elution amount dwt %/dT to a temperature), elution peaks appear at T(A) and T(B) respectively due to the difference in crystallinities of component(A) and component(B). And since this difference is sufficiently large, it is possible to separate almost at an intermediate temperature $T(C)(=\{T(A)+T(B)\}/2)$.

If the crystallinity of component(B) is very low or component(B) is completely amorphous, the peak does not appear in the measurement temperature range (in this case, main parts of component(B) are detected at the lower limit of measurement temperature (i.e. −15° C.)).

In such a case, it is considered that T(B) is present at a temperature lower than the lower limit of the measurement temperature, but since this value cannot be measured, T(B) is defined to be −15° C., which is the lower limit of the measurement temperature.

When an accumulated amount of a part eluted up to T(C) is defined as W(B) and an accumulated amount of a part eluted above T(C) is defined as W(A), W(B) almost corresponds to an amount of a low crystalline or an amorphous component (B), and an accumulated amount W(A) of a part eluted above T(C) almost corresponds to an amount of component(A) having a relatively high crystallinity.

An elution curve obtained by TREF, and a method of estimating the above various temperatures and amounts determined therefrom are illustrated by FIG. 3 (by Production Example 1).

(1-5-2) TREF Measurement

In the present invention, TREF measurement is carried out in the following manner.

A sample is dissolved in o-dichlorobenzene (0.5 mg/mL; including BHT) at 140° C. The solution is introduced into a TREF column at 140° C. and is then cooled to 100° C. at a cooling rate of 8° C./min., and is further cooled to −15° C. at a cooling rate of 4° C./min. and is maintained for 60 min. Thereafter, o-dichlorobenzene (0.5 mg/mL; including BHT) as a solvent is flown through the column at a flow rate of 1 mL/min., a component dissolved in o-dichlorobenzene at −15° C. in the TREF column is eluted for 10 min., and the column is then heated at a heating rate of 100° C./hour to 140° C. to obtain an elution curve.

(1-5-3) Specification of Ethylene Contents [E]A and [E]B of Respective Components (a) Separation of Component(A) and Component(B)

On the basis of T(C) determined by the previous TREF measurement, soluble component(B) at T(C) and insoluble component(A) at T(C) are fractionated by a large scale temperature rising elution fractionation method The fractionation method is disclosed, for example, in *Macromolecules* 21, 314-319, (1988). Concretely, the following method was used in the present invention.

(b) Fractionation Condition

Glass beads carrier (from 80 to 100 mesh) is filled in a cylindrical column having a diameter of 50 mm and a height of 500 mm and is maintained at 140° C. Thereafter, 200 mL of sample solution (10 mg/mL, solvent: o-dichlorobenzene) prepared at 140° C. is introduced into said column. The column is then cooled at a cooling rate of 10° C./hour to −15° C. After maintaining at −15° C. for 1 hour, the column temperature is raised to T(C) at a temperature-raising rate of 10° C./hour and is maintained for 1 hour.

Thereafter, while maintaining the column temperature at T(C), 800 mL of o-dichlorobenzene at T(C) is flowed at a flow rate of 20 mL/min., and a component soluble at T(C) present in the column is eluted and recovered.

Thereafter, the column temperature is raised to 140° C. at a temperature-raising rate of 10° C./hour, and the column was allowed to maintain at 140° C. for 1 hour, and by flowing 800 mL of a solvent (o-dichlorobenzene) at 140° C. at a flow rate of 20 mL/min., a component insoluble at T(C) is eluted and recovered.

The solution containing a polymer obtained by fractionation is concentrated by evaporation, and the polymer is precipitated in methanol. The precipitated polymer is recovered by filtration, and is dried for one night in a vacuum drier.

(c) Measurement of Ethylene Content by $^{13}$C-NMR

After respective components (A) and (B) are obtained by the above fractionation method, their ethylene contents (E(A) and E(B)) are determined by analyzing $^{13}$C-NMR spectra measured under the following conditions. Proton noise decoupling is used to remove $^{13}$C-$^{1}$H couplings.

Instrument: GSX-400 manufactured by JEOL Ltd. or its equivalent one (Carbon nucleus resonance frequency: at least 100 MHz)

Solvent: o-dichlorobenzene/deuterated benzene (benzene-$d_6$)=4/1 (volume ratio)

Concentration: sample/solvent ratio is set to 100 mg/mL

Temperature: 130° C.

Pulse angle: 90°

Pulse repetition time: 15 seconds

Number of accumulations: at least 5,000

A spectrum of each sample is measured under the above condition and analyzed referring to *Macromolecules* 17, 1950 (1984). Assignment of each peak is listed in Table 1. Sαα and the like in the Table 1 are expressed in accordance with Carman's method (*Macromolecules* 10, 536 (1977)), and P represents methyl carbon, S represents methylene carbon and T represents methine carbon.

TABLE 1

| Chemical Shift (ppm) | Assignment |
|---|---|
| 45 to 48 | Sαα |
| 37.8 to 37.9 | Sαγ |
| 37.4 to 37.5 | Sαδ |
| 33.1 | Tδδ |

TABLE 1-continued

| Chemical Shift (ppm) | Assignment |
|---|---|
| 30.9 | $T\beta\beta$ |
| 30.6 | $S\gamma\gamma$ |
| 30.2 | $S\gamma\delta$ |
| 29.8 | $S\delta\delta$ |
| 28.7 | $T\beta\beta$ |
| 27.4 to 27.6 | $S\beta\delta$ |
| 24.4 to 24.7 | $S\beta\beta$ |
| 19.1 to 22.0 | P |

When "P" represents a propylene unit and "E" represents an ethylene unit in the chain of a copolymer, six kinds of triads, PPP, PPE, EPE, PEP, PEE and EEE are present in the chain. Described in *Macromolecules* 15, 1150 (1982), relationships between the triad concentration and the peak intensity are shown as $$[PPP]=k\times I(T\beta\beta) \quad (1)$$

$$[PPE]=k\times I(T\beta\delta) \quad (2)$$

$$[EPE]=k\times I(T\delta\delta) \quad (3)$$

$$[PEP]=k\times I(S\beta\beta) \quad (4)$$

$$[PEE]=k\times I(S\beta\delta) \quad (5)$$

$$[EEE]=k\times\{I(S\delta\delta)/2+I(S\gamma\delta)/4\} \quad (6)$$

Where, [ ] represents a fraction of triad, k is a constant and I( ) is a peak intensity. $I(T_{\beta\beta})$, for example, represents a peak intensity at 28.7 ppm attributed to $T_{\beta\beta}$. Since [ ] is a triad fraction, there is a necessary relationship $$[PPP]+[PPE]+[EPE]+[PEP]+[PEE]+[EEE]=1 \quad (7)$$

By using the above equations (1) to (7), a fraction of each triad is determined. An ethylene content is then determined by the following equation.

Ethylene content (mol %)=([PEP]+[PEE]+[EEE])×100

The propylene random copolymer of the present invention may include weak irregular peaks derived from 2,1-insertion and 1,3-insertion as listed in Table 2.

TABLE 2

| Chemical Shift [ppm] | Assignment |
|---|---|
| 42 | $S\alpha\alpha$ |
| 38.2 | $T\alpha\gamma$ |
| 37.1 | $S\alpha\delta$ |
| 34.1 to 35.6 | $S\alpha\beta$ |
| 33.7 | $T\gamma\gamma$ |
| 33.3 | $T\gamma\delta$ |
| 30.8 to 31.2 | $T\beta\gamma$ |
| 30.5 | $T\beta\delta$ |
| 30.3 | $S\alpha\beta$ |
| 27.3 | $S\beta\gamma$ |

In order to determine an accurate ethylene content, it is necessary to make calculation by taking those small peaks (derived from 2,1- and/or 1,3-insertion) into account. However, it is impossible to completely resolve these peaks and identify them. In addition, because the amount of 2,1- and 1,3-insertion is very small, the ethylene content of the present invention is determined simply from equation (1) to (7) in the same manner as in analysis of a copolymer made with a conventional Ziegler-Natta catalyst which contains substantially no 2,1- or 1,3-bonds.

A conversion of ethylene mol % to wt % is carried out in accordance with the following formula.

Ethylene content (wt %)=(28×X/100)/{28×X/100+42×(1−X/100)}×100

In the above formula, X is an ethylene content expressed by mol %.

Also, an ethylene content of the whole block copolymer (E)W is calculated from the above measured respective ethylene contents (E)A and (E)B of components (A) and (B) and weight ratios W(A) and W(B) of the respective components calculated by TREF in accordance with the following formula.

(E)W={(E)A×W(A)+(E)B×W(B)}/100 (wt %)

(1-6) Additional Requirement of Crystallinity Distribution by TREF Elution Curve By TREF elution curve, additional characters can be imparted in crystallinity distribution of the random block copolymer of the present invention.

(1-6-1) Elution Peak Temperature (T(A))

As elution peak temperature T(A) of component(A) in TREF elution curve is higher, the crystallinity of component (A) becomes higher. But it is preferable that T(A) is not too high since a low temperature heat sealing property is damaged if the crystallinity of component(A) is too high. On the other hand, if the crystallinity of component(A) is too low, a melting temperature of component(A) is low and the random block copolymer does not have a satisfactory heat resistance, and stickiness becomes remarkably bad and an anti-blocking property is damaged. Therefore, the range of T(A) is from 65 to 96° C., preferably from 65 to 88° C., more preferably at least 70° C.

(1-6-2) Temperature at which 99 wt % of Total Amount of Random Block Copolymer is Eluted in TREF (T(D))

When crystalline distribution is broad especially on the high temperature side in TREF, transparency becomes poor, and it is therefore preferable to suppress the extension to the high temperature side.

Therefore, it is preferable that the temperature T(D), which is defined as a temperature at which 99 wt % of the total amount of a random block copolymer is eluted in TREF, is not so high. And in the present invention, T(D) is at most 98° C., preferably at most 93° C., more preferably at most 90° C.

Temperature difference from T(D) to T(A) (T(D)−T(A)) is at most 5° C., preferably at most 4° C., more preferably at most 3° C.

(1-6-3) Elution Peak Temperature T(B)

On the other hand, when the crystallinity of component(B) is not sufficiently lowered, it is impossible to obtain flexibility and transparency of a random block copolymer, and therefore T(B) is at most 45° C., preferably at most 40° C.

(1-6-4) H(C)/H(A) (Ratio of Elution Height)

In the present invention, it is preferable that respective crystallinity distributions of component(A) and component (B) are narrow and respective crystallinities are separated. When respective crystallinity distributions are broad and the lower temperature side fraction of component(A) and the higher temperature side fraction of component(B) overlap, a flexibility becomes poor and heat sealing strength is not improved due to high crystallinity of component(B).

Accordingly, when an elution height H(C)[dwt %/dT] at the middle temperature T(C) between peaks T(A) and T(B) (T(c)={T(A)+T(B)}/2) is high, a large amount of overlapping fraction between the two components is contained. Thus, it is preferable that a ratio of H(C) to H(A) (H(A) is elution height at T(A)), H(C)/H(A), is smaller, and in the present invention, this value is at most 0.1, preferably at most 0.05.

(1-7) Molecular Weight of Random Block Copolymer (1-7-1) Molecular Weight

The random block copolymer used in the present invention is characterized in that an amount of a low molecular weight component is small. A low molecular weight component, particularly a component having a molecular weight so small as not to entangle with each other, bleeds out on the surface of a product, which causes poor anti-blocking property and bad transparency.

A critical molecular weight, which should be molecular weight between entanglement for polypropylene, is about 5,000 as described in *Journal of Polymer Science: Part B: Polymer Physics* 37, 1023-1033 (1999).

Accordingly, the random block copolymer of the present invention contains little amount of a low molecular weight component, and is characterized in that an amount of a low molecular weight $W(M \leq 5000)$ which is defined as an amount of a component having a molecular weight less than 5,000 in GPC is at most 0.8 wt %, preferably at most 0.5 wt %.

The preferable range of the weight average molecular weight of the random block copolymer is from 100,000 to 400,000, provided that $W(M \leq 5000)$ does not exceed 0.8 wt %. If the molecular weight exceeds the upper limit of 400,000, processability in extrusion becomes poor. The lower limit of the weight average molecular weight is not specially limited, but if the molecular weight is too small, processability in extrusion becomes poor.

(1-7-2) Measurement of Molecular Weight

In the present invention, a weight average molecular weight (Mw) and a number average molecular weight (Mn) are measured by gel permeation chromatography (GPC).

Calculation of a molecular weight from a retention volume is carried out by a calibration curve previously prepared by standard polystyrene.

The standard polystyrene used is the following products manufactured by Tosoh Corporation.

F380, F288, F128, F80, F40, F20, F10, F4, F1, A5000, A2500, A1000

The calibration curve employs third-order formula obtained by approximating by method of least squares. A viscosity formula $[\eta] = K \times M^{\alpha}$ used for calculating a molecular weight employs the following numerical values.

| | | |
|---|---|---|
| PS: | $K = 1.38 \times 10^{-4}$ | $\alpha = 0.7$ |
| PP: | $K = 1.03 \times 10^{-4}$ | $\alpha = 0.78$ |

The measurement conditions of GPC are as follows.

Apparatus: GPC (ALC/GPC 150° C.) manufactured by WATERS Company

Detector: MIRAN 1A IR detector (wavelength: 3.42 μm) manufactured by FOXBORO Company Column: AD806 M/S (three columns) manufactured by Showa Denko K. K.

| | |
|---|---|
| Mobile phase solvent: | o-dichlorobenzene |
| Measurement temperature: | 140° C. |
| Flow rate: | 1.0 ml/min. |
| Sample solution amount: | 0.2 ml |

Preparation of sample: A sample solution is prepared as concentration of 1 mg/mL using o-dichlorobenzene (including 0.5 mg/mL of BHT) as solvent at 140° C.

By plotting an elution amount to a molecular weight obtained by GPC measurement, the amount of component having a molecular weight of less than 5,000 can be determined.

(1-8) Intrinsic Viscosity of Cold Xylene Solubility [η]cxs

A cold xylene solubility (CXS) of the random block copolymer, which is a component soluble in xylene at 23° C., affects anti-blocking property when it bleeds out, and therefore measurement of intrinsic viscosity is carried out to CXS.

The CXS is obtained as follows. A random block copolymer sample is dissolved in p-xylene at 130° C., and is settled at 23° C. for 12 hours. CXS is obtained by filtrating to remove a precipitated polymer and evaporating p-xylene from the filtrate. Intrinsic viscosity of the CXS ([η]cxs) thus obtained is measured by using decalin as a solvent and using an Ubbelohde viscometer at 135° C.

In the present invention because a decrease of the [η]cxs value does not cause an increase of $W(M \leq 5000)$ which tends to bleed out easily, such a polymer as having a [72]cxs value below 2 is applicable without any trouble in contrast with a polymer obtained by a Ziegler-Natta catalyst. And such a polymer has an effect of suppressing Fish Eye (FE: the measure of the appearance) without increasing bleed-out.

(2) Preparation of Propylene-ethylene Random Block Copolymer (2-1) Metallocene Catalyst It is essential for the preparation of the propylene-ethylene random block copolymer of the present invention to employ a metallocene catalyst.

It is well known to those skilled in the art that the polyolefin with broad molecular weight and/or broad comonomer composition distribution would cause a stickiness trouble and an increase of the amount of substances which bleed out. Therefore, in the view of the prevention of these problems, it is also essential for the preparation of the random block copolymer component used in the present invention to employ a metallocene catalyst which generally gives polymers with the narrow molecular weight and narrow comonomer composition distribution.

And it is proved by the following Examples and Comparative Examples that an excellent propylene-ethylene random block copolymer of the present invention cannot be obtained by a Ziegler-Natta catalyst.

A kind of a metallocene catalyst is not limited so long as a copolymer having the aimed performances of the present invention can be obtained, but in order to satisfy the requirements of the present invention, it is preferable to use a metallocene catalyst comprising, for example, the following component(a) and component(b), and an optional component (c).

Component(a): At least one kind of metallocene transition metal compound selected from transition metal compounds expressed by the following general formula.

Component(b): At least one solid component selected from the following (b-1) to (b-4)

(b-1) Fine particle support having an organic alumioxy compound carried (b-2) Fine particle support having Lewis acid carried or ionic compound capable of reacting with and converting component(a) into cation (b-3) Fine particle of Solid acid (b-4) Ion exchangeable layer-like silicate Component(c): Organic aluminum compound (2-2) Component(a)

As the component(a), at least one kind of metallocene transition metal compound selected from transition metal compounds expressed by the following general formula can be used.

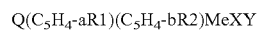

(In the above formula, Q is a divalent bonding group crosslinking two conjugated five-membered ring ligands, Me is a metal atom selected from titanium, zirconium and hafnium, X and Y are a hydrogen atom, a halogen atom, a hydrocarbon group, an alkoxy group, an amino group, a nitrogen-containing hydrocarbon group, a phosphorus-containing hydrocarbon group or a silicon-containing hydrocarbon group, X and Y may be independent, that is, the same or different, R1 and R2 are hydrogen, a hydrocarbon group, a halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group, and a and b are numbers of substituents.)

Particularly, Q is a divalent bonding group crosslinking two conjugated five-membered ring ligands such as a divalent hydrocarbon group, a silylene group or an oligosilylene group, a silylene group having a hydrocarbon group as a substituent or an oligosilylene group having a hydrocarbon group as a substituent, or a germylene group having a hydrocarbon group as a substituent. Among them, preferable examples include a divalent hydrocarbon group and a silylene group having a hydrocarbon group as a substituent.

X and Y are a hydrogen atom, a halogen atom, a hydrocarbon group, an alkoxy group, an amino group, a nitrogen-containing hydrocarbon group, a phosphorus-containing hydrocarbon group or a silicon-containing hydrocarbon group, and among them, preferable examples include hydrogen, chlorine, methyl, isobutyl, phenyl, dimethylamide or diethylamide group. X and Y may be independent, that is, the same or different.

R1 and R2 are a hydrogen group, a hydrocarbon group, a halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group. Examples of the hydrocarbon group include a methyl group, an ethyl group, a propyl group, a butyl group, a hexyl group, an octyl group, a phenyl group, a naphthyl group, a butenyl group and a butadienyl group. Also, typical examples of a halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group include a methoxy group, an ethoxy group, a phenoxy group, a trimethylsilyl group, a diethylamino group, a diphenylamino group, a pyrazolyl group, an indolyl group, a dimethylphosphino group, a diphenylphosphino group, a diphenyl boron group and a dimethoxy boron group. Among them, a hydrocarbon group having a carbon number of from 1 to 20 is preferable, and particularly preferable examples include a methyl group, an ethyl group, a propyl group and a butyl group. Adjacent R1 and R2 may bond to each other to form a ring, and the ring thus formed may have a hydrocarbon group, a halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group as a substituent.

Me is a metal atom selected from titanium, zirconium and hafnium, and is preferably zirconium or hafnium.

Among the above illustrated components(a), preferable examples for producing a propylene based polymer of the present invention include a transition metal compound comprising a ligand having a substituted cyclopentadienyl group, a substituted indenyl group, a substituted fluorenyl group or a substituted azulenyl group, crosslinked with a silylene group, a germylene group, or an alkylene group, having a hydrocarbon substituent, and particularly preferable examples include a transition metal compound comprising a ligand having a 2,4-substituted indenyl group or a 2,4-substituted azulenyl group, crosslinked with a silylene group or a germylene group, having a hydrocarbon substituent.

Non-limited examples include dimethylsilylenebis(2-methyl-4-phenylindenyl)zirconium dichloride, diphenylsilylenebis(2-methyl-4-phenylindenyl)zirconium dichloride, dimethylsilylenebis(2-methylbenzoindenyl)zirconium dichloride, dimethylsilylenebis{2-isopropyl-4-(3,5-diisopropylphenyl)indenyl}zirconium dichloride, dimethylsilylenebis(2-propyl-4-phenanthrylindenyl)zirconium dichloride, dimethylsilylenebis(2-methyl-4-phenylazulenyl)zirconium dichloride, dimethylsilylenebis{2-methyl-4-(4-chlorophenyl)azulenyl}zirconium dichloride, dimethylsilylenebis(2-ethyl-4-phenylazulenyl)zirconium dichloride, dimethylsilylenebis(2-isopropyl-4-phenylazulenyl)zirconium dichloride, dimethylsilylenebis{2-ethyl-4-(2-fluorobiphenyl)azulenyl}zirconium dichloride, dimethylsilylenebis{2-ethyl-4-(4-t-butyl-3-chlorophenyl)azulenyl}zirconium dichloride, and the like. Further examples include these compounds having a silylene group replaced by a germylene group and/or having zirconium replaced by hafnium. Since the detailed structure of the catalyst component is not an important factor of the present invention, redundant examples are not illustrated and typical examples only are illustrated, but the present invention should not be limited to the above illustrated range.

(2-3) Component(b)

As the component(b), at least one kind of solid component selected from above-mentioned component(b-1) to component(b-4) is used. These components are well known, and an optionally selected one among the well known techniques is usable. Their examples and preparations are fully disclosed in JP-A-2002-284808, JP-A-2002-53609, JP-A-2002-69116, JP-A-2003-105015 and the like.

Examples of a fine particle support used in the component (b-1) and the component(b-2) include an inorganic oxide such as silica, alumina, magnesia, silica alumina or silica magnesia, an inorganic halide such as magnesium chloride, magnesium oxychloride, aluminum chloride or lanthanum chloride, and a porous organic carrier such as polypropylene, polyethylene, polystyrene, styrenedivinylbenzene copolymer or acrylic acid based copolymers.

Also, as non-limited examples of the component(b), examples of the component(b-1) include fine particle-like carriers having methyl alumoxane, isobutyl alumoxane, methylisobutyl alumoxane, aluminum tetraisobutyl butyl-borate or the like carried, examples of the component(b-2) include fine particle-like carriers having triphenylborane, tris (3,5-difluorophenyl)borane, tris(pentafluorophenyl)borane, triphenylcarbonium tetrakis(pentafluorophenyl)borate, N,N-dimethylanilinium tetrakis(pentafluorophenyl)borate or the like carried, examples of the component(b-3) include alumina, silica alumina, magnesium chloride or the like, and examples of the component(b-4) include smectite group, vermiculite group or mica group, such as montmorillonite, zacounite, beidellite, nontronite, saponite, hectorite, stivensite, bentonite, taeniolite or the like. They may form a mixed layer.

Particularly preferable examples of the above component (b) include an ion exchangeable layer-like silicate of the component(b-4), and more preferable examples include an ion exchangeable layer-like silicate subjected to a chemical treatment such as an acid treatment, an alkali treatment, a salt treatment or an organic treatment.

(2-4) Component(c)

Examples of an optionally used component(c) include an organic aluminum compound expressed by the general formula, $$AlR_aP_{3-a}$$

(wherein R is a hydrocarbon group having a carbon number of from 1 to 20, P is a hydrogen, a halogen or an alkoxy group, and a is a number of $0<a\leqq3$), including a trialkylaluminum such as trimethylaluminum, triethylaluminum, tripropylaluminum or triisobutylaluminum, and a halogen or alkoxy-containing alkylaluminum such as diethylaluminum monochloride or diethylaluminum monomethoxide. In addition to these materials, aluminoxane's such as methyl aluminoxane are usable. Among them, a trialkylaluminum is particularly preferable.

(2-5) Preparation of Catalyst

A catalyst is prepared by contacting the component(a) and the component(b) and the optionally component(c). The contacting procedure is not limited, but can be carried out in the following order. Also, this contacting procedure may be included not only in the independent operation of the catalyst preparation but also in prepolymerization of olefin or in polymerization of olefin.

1) The component(a) and the component(b) are contacted.
2) After contacting the component(a) and the component(b), the component(c) is added thereto.
3) After contacting the component(a) and the component(c), the component(b) is added thereto.
4) After contacting the component(b) and the component(c), the component(a) is added thereto.

Also, three components may be contacted at the same time.

Respective amounts of components (a), (b) and (c) used in the present invention are optional. For example, an amount of component(a) to component(b) is preferably from 0.1 to 1,000 μmol, more preferably from 0.5 to 500 μmol, to 1 g of component(b). An amount of component(c) to component(b) is preferably from 0.001 to 100 mmol in terms of an aluminum metal amount, more preferably from 0.005 to 50 mmol, to 1 g of component(b). Accordingly, an amount of component(c) to component(a) is preferably from $10^{-3}$ to $10^6$ in terms of a metal mol ratio, more preferably from $10^{-2}$ to $10^5$.

The catalyst of the present invention is preferably subjected to prepolymerization in which the catalyst is contacted with an olefin monomer and somewhat grown up with a small amount of polymer before polymerization. The olefin monomer used is not limited, but its examples include ethylene, propylene, 1-butene, 1-hexene, 1-octene, 4-methyl-1-pentene, 3-methyl-1-butene, vinylcycloalkane, styrene and the like, and among them, propylene is particularly preferable. A monomer is supplied to the reaction vessel in an optional procedure, for example, at a constant rate, or at a constant pressure so as to hold a reaction pressure constant, their combination or in a sequentially programmed method. Prepolymerization temperatures are not limited but preferably in the range of −20 to 100° C. The prepolymerization time is not limited but preferably in the range of 5 minutes to 24 hours. Relative amounts of prepolymerized polymer to the component(b) are preferably from 0.01 to 100, more preferably from 0.1 to 50. After the prepolymerization, the catalyst may be used as it is, depending on the catalyst feed system, or may be dried if necessary.

At the same time of contacting of the above components or after contacting, a polymer such as polyethylene, polypropylene or polystyrene and/or an inorganic oxide solid such as silica or titania may be present therein.

(2-6)Polymerization (2-6-1) Sequential Polymerization

In order to prepare the propylene-ethylene random block copolymer of the present invention, it is necessary to carry out sequential polymerization to get a crystalline propylene-ethylene random copolymer(A) and a low crystalline or an amorphous propylene-ethylene random copolymer component(B) individually.

In the case of a propylene-ethylene random copolymer prepared by simple copolymerization of propylene with ethylene, when the ethylene content is low, flexibility and transparency are not sufficient, and when the ethylene content is increased to improve flexibility and transparency, heat resistance becomes poor. Consequently, it is difficult to satisfy all of these properties.

Accordingly, in order to obtain all of transparency, flexibility and heat resistance in good balance, the propylene-ethylene random block copolymer of the present invention has to be prepared by sequential polymerization to get two components having respectively different ethylene contents in two steps.

Also, in the present invention, since there is a case that a copolymer having a low molecular weight and being sticky is used as a component(B), it is necessary to prepare a component(B) after a component(A) in the polymerization procedure, for the purpose of preventing such a problem of stickiness as a fouling trouble in the reactor. When carrying out sequential polymerization, it is possible to employ any of a batch process and a continuous process, but it is generally preferable to employ a continuous process in view of productivity.

In the case of a batch polymerization process, it is possible to prepare a component(A) and a component(B) individually in a single reactor by changing the polymerization conditions sequentially. As long as the present invention is efficient, it is possible to multiply the reactors in parallel.

In the case of a continuous polymerization process, it is necessary to employ at least two reactors connected in series in order to prepare a component(A) and a component(B) individually. As long as the present invention is effective, it is possible to multiply the reactors in series and/or in parallel for a component(A) and a component(B) respectively.

(2-6-2) Polymerization Process

As the polymerization process, it is possible to employ an optional polymerization process such as a slurry process, a bulk process, a gas phase process or the like. It is possible to employ a supercritical condition as an intermediate condition between the bulk phase (liquid phase) and the gas phase, but since this is substantially equivalent to the gas phase, this may be included in the gas phase process without discrimination.

Since a low crystalline or an amorphous propylene-ethylene random copolymer (component(B)) tends to dissolve in an organic solvent such as hydrocarbon or liquid propylene, it is preferable to employ the gas phase process for a component (B).

A crystalline propylene-ethylene random copolymer component(A) can be produced by any process, but for the relatively less crystalline component(A), it is preferable to employ the gas phase process in order to prevent a fouling trouble.

Consequently, it is most preferable to employ the continuous polymerization process and to produce a crystalline propylene-ethylene random copolymer (component(A)) in the bulk phase (liquid phase) or in the gas phase and then to produce a low crystalline or an amorphous propylene-ethylene random copolymer elastomer (component(B)) in the gas phase.

(2-6-3) Other Polymerization Conditions

Usual polymerization conditions are applicable in general. Concretely, polymerization temperatures in the range of 0 to 200° C., preferably 40 to 100° C., are applicable.

Polymerization pressures depend on the process employed, and usual pressures are applicable in general. For example, polymerization pressures are in the range of 0 to 200 MPa, preferably 0.1 to 50 Mpa. An addition of an inert gas such as nitrogen to the system is not limited.

When sequential polymerization is carried out to prepare a component(A) in the first step and a component(B) in the second step, it is preferable to add an activity suppressive reagent in the second step. In the production of a propylene-ethylene block copolymer, an addition of an activity suppressive reagent to the reactor where ethylene-propylene random copolymerization is carried out in the second step can improve powder characteristics (such as fluidity) and material properties such as gel content. There are various techniques in this field, examples of which are illustrated in JP-B-63-54296, JP-A-7-25960 and JP-A-2003-2939. It is preferable to apply these techniques to the present invention.

(3) Adjustments of the Constituents of Propylene-ethylene Random Block Copolymer Each factor of the propylene-ethylene random block copolymer of the present invention can be adjusted in the following manner so as to satisfy the requirements for the present invention.

(3-1) Component(A)

With regard to a crystalline propylene-ethylene random copolymer component(A), it is necessary to adjust an ethylene content [E]A, T(A) and Tm. Tm is a melting temperature obtained by. DSC measurement.

In the present invention, since the crystallinity distribution of the component(A) is narrow, T(A) and Tm correspond to each other substantially, therefore the higher T(A) value results in the higher Tm value, and vice versa. Because a component(A) of the present invention is a propylene-ethylene random copolymer, the higher E(A) value results in the lower Tm value, and vice versa. Accordingly, if you want to adjust T(A) values and Tm values within the claimed range of the present invention, you only have to adjust [E]A values within the desired range on the basis of the relationship between [E]A and T(A), and between [E]A and Tm, determined by the preceding examination. In the present invention, in order to adjust the [E]A value within the desired range, the feed ratio of ethylene to propylene to the polymerization vessel in the first step has to be appropriately adjusted. Indeed the relationship between the feed ratio of ethylene to propylene to the polymerization vessel and the ethylene content in the obtained propylene-ethylene random copolymer depends on the metallocene catalyst used, but the feed ratio of the monomers can be appropriately adjusted to prepare the component(A) having an optional ethylene content [E]A. For example, in order to adjust the [E]A value in the range of 1 to 10 wt %, the feed ratio of ethylene to propylene can be adjusted in the range of 0.001 to 0.3 wt %, preferably 0.005 to 0.2 wt %.

A propylene-ethylene random block copolymer having such a component(A) has a melting temperature (Tm) in the range of 105 to 140° C., preferably 110 to 135° C. obtained by DSC measurement, which is relatively low as polypropylene, and expected to improve the processability at a low temperature. However, because of the narrow crystallinity distribution of the component(A), the T(A) value is decreased as the [E]A value is increased. Accordingly, in order to adjust the T(A) value so as to satisfy the claimed range, the [E]A value has to be adjusted within the desired range on the basis of the relationship between them determined by the preceding examination.

In order to adjust the factors of the component(A) so as to satisfy the requirements for the present invention, it is necessary to adjust the ethylene content in the component(A) in the range of 1 to 10 wt %, preferably 1.5 to 6 wt %.

(3-2) Component(B)

With regard to a low crystalline or an amorphous propylene-ethylene random copolymer (component(B)), it is necessary to adjust an ethylene content [E]B, T(B) and [η]cxs. In the present invention, in order to adjust the [E]B value within the desired range, the feed ratio of ethylene to propylene in the second step has to be appropriately adjusted in the same manner as in the [E]A value adjustment. For example, in order to adjust the [E]B value within the range of 7 to 22 wt %, the feed ratio of ethylene to propylene can be adjusted within the range of 0.01 to 5 wt %, preferably 0.05 to 2 wt %.

Indeed, the crystallinity distribution of the component(B) becomes somewhat broader in accordance with the increase of the ethylene content, but the T(B) value is decreased in accordance with the increase of the [E]B value in the same manner as described on the component(A).

Accordingly, in order to adjust the T(B) value so as to satisfy the claimed range, the [E]B value has to be adjusted within the desired range on the basis of the relationship between [E]B and T(B) determined by the preceding examination.

Indeed, washing the usual random block copolymer with a solvent also gives such a random block copolymer as the present invention that contains little amount of the low molecular weight fraction, but in such a case, productivity is remarkably lowered. Also, it is possible to suppress the production of the low molecular weight fraction by increasing the average molecular weight, which causes the increase of the viscosity of the whole random block copolymer to a great extent, and results in the poor processability. The rheology control of the whole polymer by the additional organic peroxide can prevent this poor processability, however, which causes the other problem that the decomposed compounds of the organic peroxide smell bad.

(3-3) W(A) and W(B)

As far as amount W(A) of the component(A) and amount W(B) of the component(B) are concerned, the ratio of the amount of the component(A) produced in the first step to the amount of the component(B) produced in the second step can be adjusted to get an optional set of the W(A) value and the W(B) value. For example, it is possible to increase W(A) and to decrease W(B) by the operation that the production amount in the first step are held and the production amount in the second step are decreased, which can be easily controlled by the usual procedures in the second step, that is, reducing the residence time, lowering the polymerization temperature or increasing the feed of the activity suppressive reagent, and vice versa.

In order to set the practical conditions, it is necessary to consider the decay of the activity. Thus, in the range of the ethylene contents [E]A and [E]B in the present invention, generally, the polymerization activity tends to increase and the decay of the polymerization activity tends to be intensified as the increase of the feed ratio of ethylene to propylene to raise an ethylene content. Accordingly, in order to keep the catalyst still active enough in the second step, it is necessary to suppress the polymerization activity in the first step. For example, the operation conditions can be set as the combination of the following typical procedures; decreasing the ethylene content [E]A, reducing the production amount W(A), and if necessary, lowering the polymerization temperature and/or reducing the polymerization time (residence time) in the first step, or increasing the ethylene content [E]B, increasing the production amount W(B), and if necessary, raising the polymerization temperature and/or prolonging the polymerization time (residence time) in the second step.

(3-4) Glass Transition Temperature (Tg)

In the random block copolymer of the present invention, it is necessary that the temperature-tan δ curve, as discussed above, should show a single peak at 0° C. or lower. In order to make tan δ curve showing a single peak, the most important factor is that [E]gap (=[E]B−[E]A), which is defined as the difference between the ethylene content [E]A in the component(A) and the ethylene content [E]B in the component(B), is at most 15 wt %, preferably at most 13 wt %, It is possible to obtain the polymer with the desired [E]gap value by the adjustment of the feed ratio of ethylene to propylene in the preparation of the component(B), so as to make the ethylene content [E]B of the low crystalline or the amorphous copolymer component(B) in the appropriate range according to the ethylene content [E]A of the crystalline copolymer component(A).

(3-5) Mw

In the present invention, a component(A) and a component (B) are miscible, the following formula is applicable;

Log [η]$W$={$W(A)$×Log [η]$A$+$W(B)$×Log [η]$B$}/100 wherein [η]A is the intrinsic viscosity of component(A) and [η]B the intrinsic viscosity of component(B) and [η]W the intrinsic viscosity of whole propylene-ethylene random block copolymer.

Generally, since there is a certain relationship between Mw and [η], Mw can be freely controlled by varying [η]A in accordance with the above formula when [η]B, W(A) and W(B) are set at first in view of flexibility and heat resistance.

(3-6) H(C) and T(D)

T(D) is defined as a temperature at which 99 wt % of the total amount of random block copolymer is eluted in TREF. Both of H(C) and T(D) are indices of crystallinity distributions. As the crystallinity distribution of component(A) is narrower, T(D) becomes closer to T(A). As both of crystallinity distributions of component(A) and component(B) are narrower and a crystallinity difference between the two components is larger, H(C) becomes a lower value. Thus, H(C) becomes low and T(D) closes to T(A), if crystallinity distributions of component(A) and component(B) are controlled to be narrow.

Generally, a metallocene catalyst makes the crystallinity distribution of the obtained polymer narrower than a Ziegler-Natta catalyst, but in such a sequential polymerization system as in the present invention, it is not always sufficient to employ a metallocene catalyst to achieve the efficiently narrow crystallinity distribution.

In order to prepare the product propylene-ethylene random block copolymer having the desirable properties, it is necessary to make the component(A) and the component(B) have respectively different specific polymer compositions. Thus, it is necessary to adjust the polymerization conditions corresponding to the respective polymer compositions in the first step and in the second step, particularly to hold monomer gas compositions at respectively different specific values. Accordingly, if the employed process would tend to make the crystallinity distribution of the component(B) broader, additional modifications would be necessary, for example, the modification of the polymer transfer system between vessels so as to prevent the carry-over of the specific monomer gas mixture in the first step into the second step. In this example, practical procedures are illustrated as following; in the polymer transfer system, by means of the increase of the purged gas flow or the dilution or the substitution of the reactive monomer gas mixture from the preceding reactor vessel with an inert gas such as nitrogen, the crystallinity distribution of the component(B) becomes narrower. Thus, by the modification in the polymer transfer system, the H(C) value can be controlled to be low.

(3-7) W(M≦5000)

It is possible to control the W(M≦5000) value small just as described above. Generally, a metallocene catalyst makes the molecular weight distribution of the obtained polymer narrower than a Ziegler-Natta catalyst. However, in such a sequential polymerization system as in the present invention, it is not always sufficient to employ a metallocene catalyst to make the molecular weight distribution narrow enough. Particularly, in order to prevent the formation of the low molecular weight component, it is possible to control the W(M≦5000) value low independently from the polymerization conditions by means of the reduction of the duration in the polymer transfer system from the first step reactor vessel to the second one or the complete substitution of the reactive monomer gas mixture employed in the first step with an inert gas such as nitrogen in the polymer transfer step.

In the propylene-ethylene random block copolymer of the present invention, by means of the selection of the metallocene catalyst and the adjustment of the polymerization conditions, it is possible to prevent the formation of the low molecular weight component which would cause a stickiness and bleed-out, therefore, the intrinsic viscosity of the low crystalline or an amorphous component can also be lowered.

(3-8) Intrinsic viscosity of CXS

Since the component(A) of the random block copolymer of the present invention obtained by a metallocene catalyst substantially contains little amount of CXS fraction, the [η]cxs value can be controlled by the molecular weight of the component(B).

The [η]cxs value can be adjusted by the feed ratio of hydrogen to the sum of monomers in the second step as usual. Because a metallocene catalyst tends to produce a lower molecular weight polymer at the higher polymerization temperature, it is also possible to adjust the [η]cxs value by the polymerization temperature. Further, it is possible to adjust the [η]cxs value by the combination of the hydrogen feed ratio and the polymerization temperature.

(4) Other Polymers and Additives (Optional Components)

In the propylene-ethylene random block copolymer of the present invention, it is possible to contain other polymers and additives (optional components) in such a range as not to lower its properties.

Examples of the additives include a nucleating agent, a phenolic type antioxidant, a phosphorus type antioxidant, a sulfur type antioxidant, a neutralizing agent, a light stabilizer, an UV stabilizer, a lubricant, an antistatic agent, a metal deactivating agent, a peroxide, a filler, an antibacterial and mildewproofing agent, a fluorescent brightening agent and other various additives, which are conventionally used for a polyolefin resin.

An amount of these additives is generally from 0.0001 to 3 wt %, preferably from 0.001 to 1 wt %.

Examples of the nucleating agent include sodium 2,2-methylene-bis(4,6-di-t-butylphenyl)phosphate, talc, a sorbitol type compound such as 1,3,2,4-di(p-methylbenzylidene)sorbitol, aluminum hydroxy-di(t-butylbenzoate, a mixture of 2,2-methylene-bis(4,6-di-t-butylphenol)phosphoric acid and lithium $C_8$-$C_{20}$ aliphatic monocarboxylate (tradename NA21 manufactured by Asahi Denka Kogyo K. K.), and the like.

Examples of the phenolic type antioxidant include tris-(3,5-di-t-butyl-4-hydroxybenzyl)-isocyanurate, 1,1,3-tris(2-methyl-4-hydroxy-5-t-butylphenyl)butane, octadecyl-3-(3,5-di-t-butyl-4-hydroxyphenyl)propionate, pentaerythritol-tetrakis{3-(3,5-di-t-butyl-4-hydroxyphenyl)propionate}, 1,3,5-trimethyl-2,4,6-tris(3,5-di-t-butyl-4-hydroxybenzyl)benzene, 1,3,5-tris(4-t-butyl-3-hydroxy-2,6-dimethylbenzyl)isocyanuric acid, and the like.

Examples of the phosphorus type antioxidant include tris(mixed mono-dinonylphenylphosphite), tris(2,4-di-t-butylphenyl)phosphite, 4,4'-butylidenebis(3-methyl-6-t-butylphenyl-di,tridecyl)phosphite, 1,1,3-tris(2-methyl-4-di,tridecylphosphite-5-t-butylphenyl)butane, and the like.

Examples of the sulfur type antioxidant include di-stearyl,thio,di-propionate, di-myristyl,thio,di-propionate, pentaerythritol, tetrakis-(3-lauryl,thio-propionate), and the like.

Examples of the neutralizing agent include calcium stearate, zinc stearate, hydrotalcite, Mizukalac (manufactured by Mizusawa Industrial Chemicals, Ltd.), and the like.

Examples of a hindered amine type stabilizer include a polycondensate of dimethyl succinate and 1-(2-hydroxyethyl)-4-hydroxy-2,2,6,6-tetramethylpiperidine, tetrakis(1,2,2,6,6-pentamethyl-4-piperidyl)1,2,3,4-butanetetracarboxylate, bis(1,2,2,6,6-pentamethyl-4-piperidyl)sebacate, N,N-bis(3-aminopropyl)ethylenediamine-2,4-bis{N-butyl-N-(1,2,2,6,6-pentamethyl-4-piperidyl)amino}-6-chloro-1,3,5-triazine condensate, bis(2,2,6,6-tetramethyl-4-piperidyl)sebacate, poly{6-(1,1,3,3-tetramethylbutyl)imino-1,3,5-triazine-2,4-diyl}{(2,2,6,6-tetramethyl-4-piperidyl)imino}hexamethylene{(2,2,6,6-tetramethyl-4-piperidyl)imino}, and the like.

Examples of the lubricant include higher aliphatic amides such as oleic acid amide, stearic acid amide, behenic acid amide or ethylenebisstearoid, silicone oil, higher aliphatic acid esters, and the like.

Examples of the antistatic agent include higher aliphatic acid glycerin ester, alkyldiethanolamine, alkyldiethanolamide, alkyldiethanolamide aliphatic acid monoester, and the like.

Particularly, it is preferable to contain an anti-blocking agent. Preferable examples of the anti-blocking agent include organic or inorganic fine particles having an average particle size from 0.5 to 5 μm, preferably from 1 to 4 μm. If the average particle size is less than 0.5 μm, the anti-blocking effect becomes poor. If the average particle size exceeds 5 μm, transparency is degraded. Its blending amount is from 0.05 to 0.6 part by weight, preferably from 0.1 to 0.5 part by weight, to 100 parts by weight of the propylene-ethylene random block copolymer. If the amount of anti-blocking agent is less than 0.05 part by weight, the anti-blocking effect is poor. If the amount exceeds 0.6 part by weight, transparency is degraded. Examples of the organic fine particles include non-melting type polysiloxane fine particles, polyamide fine particles, acrylic resin fine particles, condensation type fine particles having a triazine ring, and the like. Among them, it is preferable to employ non-melting type polysiloxane fine particles or crosslinking methyl polymethacrylate fine particles. Examples of the inorganic fine particles include silica, zeolite, kaolin, talc and the like. Among them, it is preferable to employ silica.

Also, other polymers may be blended in such a range as not to lower its properties, examples of which include an ethylene-propylene random copolymer, an ethylene-butene random copolymer, an ethylene-hexene random copolymer, an ethylene-octene random copolymer, a propylene-butene random copolymer, a polybutene, and the like. These polymers may be blended in an amount of at most 30 wt %, preferably at most 20 wt %.

Especially, a crystalline butene-1 based polymer may be added in an amount of 5 to 45 parts by weight to 100 parts by weight of the propylene-ethylene random block copolymer to further improve low temperature heat sealing property. Examples of the crystalline butene-1 based polymer include a butene-1 homopolymer, a copolymer of butene-1 and other α-olefin such as ethylene or propylene, and the like. It is preferable for improving transparency to employ such a polymer as having an MFR value equivalent to or larger than that of the above random block copolymer.

These additional components may be added to the propylene-ethylene random block copolymer of the present invention before compounding, or may be added during compounding. Further, they may be directly added after compounding, or may be added as a master batch in such a range as not to lower its properties. Further, they may be added by their combination.

Generally, after blending additives such as an antioxidant, a neutralizing agent or the like, they are mixed, compounded, and are then processed into a product. At the time of processing, other resins or other additional components (including a master batch) may be added so long as they do not remarkably damage the effect of the present invention.

The above mixing or compounding can be carried out by conventional known methods, usually by using a Henschel-mixer, a super-mixer, a V blender, a tumbler mixer, a ribbon blender, a Banbury-mixer, a kneader blender, a single screw extruder or twin screw extruder, or the like. Among them, it is preferable to carry out compounding by using a single screw extruder or twin screw extruder.

(5) Use and Processing Method of the Present Invention

The propylene-ethylene random block copolymer of the present invention has improved transparency and flexibility, no tackiness of product, suppressed bleed-out, excellent processability, particularly at a low temperature. Thus, the propylene-ethylene random block copolymer of the present invention is an industrially useful high molecular elastomer material as a film, a sheet and a laminated material, or a covering material for various containers.

Particularly, since bleeding is suppressed and stickiness is remarkably lowered, it is suitably used as a film or sheet having a satisfactory appearance, which does not cause blocking.

Also, it is satisfactorily used as various containers for foods and for medical and industrial uses since it does not substantially pollute contents by bleeding.

Also, it can be satisfactorily used as a molded product since deterioration of appearance by bleeding as a lapse of time is not caused.

These various products can be produced by well known processing methods. Examples of an extrusion method for a film or sheet include air-cooling tubular process, water-cooling tubular process, flat process, monoaxially orientation process, biaxially orientation process, calendar process and the like.

Also, when it is used as a film or sheet, it is possible to use as a layer in multi-layer structure. Thus, it can be used as an intermediate layer and also it can be used as a surface.

Examples of a molding method for containers include thermoforming, pressure forming, vacuum forming, vacuum pressure forming, blow molding, stretch-blow molding, injection molding and the like.

In order to obtain a molded product, it is possible to employ not only ordinary injection molding, but also insert molding, sandwich molding, gas assist molding or the like, and it is also possible to employ press molding, stamping molding, rotary molding or the like.

Since these molded products have heat resistance, it is suitable to be used for sterilizing with hot water or to be used at a relatively high temperature and it is characterized by not being deformed and is also characterized by not degrading transparency by bleed-out when applying heat.

3. Production of Biaxially Oriented Multi-layer Film (1) Multi-layer Method

The biaxially oriented multi-layer film of the present invention, having surface layer composed of the above-mentioned propylene-ethylene random block copolymer on at least one surface on a base layer composed of crystalline polyolefin based polymer, is produced by co-extrusion process or lamination process.

The method for producing a multi-layer film is preferably following that firstly multi-layer sheet is produced in flat film co-extrusion process and secondly the sheet is drawn biaxially, as that process can produce thin film easily and uniformly. And tubular film co-extrusion process or lamination process can be used.

(2) Orientation

In biaxial orientation process, MD drawing is carried out with drawing ratio from 3 to 8 times, preferably from 4 to 6 times, at a temperature from 90 to 140° C., preferably from 105 to 135° C., and TD drawing is then carried out with drawing ratio from 3 to 12 times, preferably from 6 to 11 times in a tenter. In order to prevent heat shrinkage at the time of heat sealing, it is preferable to be applied to heat setting at a temperature from 120 to 170° C. after the crosswise orientation.

(3) Other Treatments

Further, the film may be subjected to surface treatment such as corona treatment for the purpose of improving printing property and bleeding of antistatic agent.

(4) Thickness

The thickness of the biaxially oriented multi-layer film is usually from 5 to 100 µm, preferably from 10 to 60 µm. Also, in the biaxially oriented multi-layer film, a thickness of the surface layer is generally from 0.1 to 6 µm, preferably from 0.2 to 5 µm, more preferably from 0.3 to 3 µm. If the thickness of the surface layer exceeds the above-mentioned range, packaging property becomes poor. Also, if the thickness is less than the above-mentioned range, a uniform heat sealing strength cannot be obtained.

EXAMPLES

The present invention is further illustrated with reference to the following Examples and Comparative Examples, but should not be limited thereto.

Various physical properties of block copolymers obtained in the following Examples and Comparative Examples were measured in accordance with the following methods.

1) Melt Flow Rate (MFR)

Melt flow rate was measured under the following conditions in accordance with JIS K7210A, method condition M.

Test temperature: 230° C.
Nominal load: 2.16 kg
Die shape: Diameter 2.095 mm, length 8.00 mm

2) TREF

TREF measuring method is concretely described heretofore.

Apparatus
(TREF part)
TREF column: 4.3 mm diameter, 150 mm length stainless steel column Column filler: 100 µm glass beads having a surface subjected to inert treatment
Heating system: Aluminum heating block
Cooling system: Peltier element (cooling of Peltier element is made by water cooling)
Temperature distribution: ±0.5° C. Temperature controlling device: Digital program adjuster KP1000 (valve oven) manufactured by Chino Corporation
Heating system: Air bath system oven
Temperature at the time of measurement: 140° C.
Temperature distribution: ±1° C.
Valve: 6-forked valve, 4-forked valve
(Sample charging part)
Charging system: Loop charging system
Charging amount: Loop size 0.1 ml
Charging inlet heating system: Aluminum heating block
Temperature at the time of measuring: 140° C.
(Detection part)
Detector: Wavelength fixed type infrared detector MIRAN 1A manufactured by FOXBORO Company
Detecting wavelength: 3.42 µm
High temperature flow cell: Micro flow cell for LC-IR, optical path length 1.5 mm, synthetic sapphire window plate
Measurement temperature: 140° C.
(Pump part)
Pump: SSC-3461 pump manufactured by Senshu Scientific Co., Ltd.
Measuring Conditions
Solvent: o-dichlorobenzene (including 0.5 mg/mL of BHT)
Sample concentration: 5 mg/mL
Sample charging amount: 0.1 mL
Solvent flow rate: 1 mL/min 3) Dynamic Mechanical Analysis A strip-like piece of 10 mm width×18 mm length×2 mm thickness cut from a sheet of 2 mm thickness injection-molded under the following conditions was used as a test piece. ARES manufactured by Rheometric Scientific inc. was used as a test apparatus. A frequency of 1 Hz was employed. A measurement temperature was raised step by step from −60° C., and the measurement was carried out until the test piece was melted to be impossible for measurement. A strain was controlled within a range of 0.1 to 0.5%.
(Preparation of Test Piece)
Test piece was prepared in injection molding.
(See the below paragraph "molding")

4) DSC

By using DSC instrument manufactured by Seiko Instruments Inc., 5.0 mg of a sample was maintained at 200° C. for 5 min. Thereafter, the sample was crystallized by lowering the temperature at a rate of 10° C./min.

8) Calculation of Ethylene Content

Ethylene content was calculated in accordance with the above-mentioned method by using $^{13}$C-NMR.

Production Example 1

Preparation of Prepolymerized Catalyst
(Chemical Treatment of Silicate)

3.75 liters of distilled water and then 2.5 kg of concentrated sulfuric acid (96%) were slowly added to a glass-made separable flask of 10 liters equipped with a stirrer. 1 kg of montmorillonite (Benclay SL manufactured by Mizusawa Industrial Chemicals, Ltd.: average particle size=25 µm, particle size distribution=10-60 µm) was dispersed therein at 50° C., and the resultant slurry was heated to 90° C. and was maintained at that temperature for 6.5 hours. After cooling to 50°

C., the slurry was filtrated under a reduced pressure to recover a cake. The cake was dispersed with 7 Liters of distilled water, followed by filtration. This washing procedure was repeated until a pH value of a washing liquid (filtrate) exceeded 3.5. The cake thus recovered was dried at 110° C. in nitrogen atmosphere for overnight. After drying, 707 g of silicate was obtained.

(Drying of Silicate)

The above chemically treated silicate was dried by a kiln drier under the following drying conditions.

Rotatory cylinder: Cylinder-like, inner diameter 50 mm, heating zone 550 mm (electric furnace); rotation number of scraping vane: 2 rpm; inclination angle: 20/520; supplying rate of silicate: 2.5 g/min; gas flow rate: nitrogen 96 liters/hour; counter current drying temperature: 200° C. (powder temperature)

(Preparation of Catalyst)

20 g of dry silicate was introduced into a glass-made reactor equipped with a stirring vane having an inside volume of 1 liter, 116 ml of mixed heptane and 84 ml of heptane solution (0.60 M) of triethyl aluminum were added thereto, and the resultant mixture was stirred at room temperature. After one hour, the mixture was washed with mixed heptane and 200 ml of silicate slurry was prepared. Thereafter, 0.96 ml of heptane solution (0.71 M/L) of triisobutyl aluminum was added to the above prepared silicate slurry, and the resultant mixture was reacted at 25° C. for 1 hour. On the other hand, 218 mg (0.3 mM) of [(r)-dichloro[1,1'-dimethylsilylenebis{2-methyl-4-(4-chlorophenyl)-4H-azulenyl}]zirconium] in 87 ml of mixed heptane was treated with 3.31 ml of heptane solution (0.71 M) of triisobutyl aluminum at room temperature for 1 hour. This crude product was added to the silicate slurry, and after stirring for 1 hour, mixed heptane was further added to the slurry to make 500 ml.

(Prepolymerization/Washing)

The above prepared silicate/metallocene complex slurry was introduced into a stirring type autoclave having an inside volume of 1.0 liter which was fully substituted with nitrogen. When a temperature was stabilized at 40° C., propylene was supplied at a rate of 10 g/hour holding the reaction temperature at 40° C. After four hours, supplying of propylene was stopped, and prepolymerization was continued for further 2 hours.

The remaining monomer was purged out to stop prepolymerizaion and stirring was stopped. The reaction mixture was settled for about 10 min., and 240 ml of solvent was removed. Thereafter, 0.95 ml of heptane solution (0.71 M/L) of triisobutyl aluminum and then 560 ml of mixed heptane were added thereto, and the reaction mixture was stirred at 40° C. for 30 min. and settled for 10 min. Thereafter, 560 ml of solvent was removed. Further, this procedure was repeated three times. Analysis of the last washing solvent said that the organic aluminum compounds and Zr were contained at the concentration of 1.23 mmol/L and $8.6 \times 10^{-6}$ g/L respectively, which corresponds to 0.016% of the charge. After adding 17.0 ml of heptane solution of triisobutyl aluminum (0.71 M/L), this product was dried at 45° C. in vacuo. The prepolymerized catalyst containing 2.0 g of polypropylene per gram of catalyst was obtained.

(The above catalyst preparation procedure was referred to Example 1 of JP-A-2002-284808.)

With this prepolymerized catalyst, a range of propylene-ethylene random block copolymers was prepared by the following procedure.

First Step 3L-autoclave reactor equipped with a stirrer and a thermal controller was sufficiently purged with propylene. 2.76 ml of n-heptane solution of triisobutyl aluminum (2.02 mmol), 38 g of ethylene, 80 ml of hydrogen and 750 g of liquid propylene were introduced to this reactor respectively, and the reactor temperature was raised to and held at 45° C. Polymerization was started with pressure-assisted introduction of 35 mg (prepolymer is excluded) of the prepolymerized catalyst described above in suspension in n-heptane. During polymerization of 75 min. the reactor temperature was kept at 45° C. Thereafter, a remaining monomer was purged to the normal pressure, and the reactor atmosphere was completely replaced with purified nitrogen. A part of the product polymer was sampled and analyzed, which had an ethylene content of 3.7 wt % and MFR of 16.3 g/10 min.

Second Step

On the other hand, a mixed gas for the second step of the polymerization was prepared in another autoclave of 20 liters equipped with a stirrer and a thermal controller. The mixed gas was prepared at 80° C. at the composition of ethylene 32.95 vol %, propylene 66.90 vol % and hydrogen 1500 volppm. After the sampling of the first step, the mixed gas was supplied to the reactor to start the second step of polymerization.

Polymerization was carried out at 80° C. at 2.5 MPa for 29 min., and quenched with 10 ml of ethanol. A recovered polymer product was sufficiently dried in an oven. The results were following: yield 331 g, activity 9.5 kg/g-cat, ethylene content 8.7 wt %, MFR 16.6 g/10 min.

Production Example 2

First Step

At the first step, propylene-ethylene random copolymerization was carried out in the liquid pool reactor of 0.4 m$^3$ equipped with a stirrer. Liquid propylene, liquid ethylene and triisobutyl aluminum were continuously supplied to the reactor at the feed rate of 90 kg/hr, 3.0 kg/hr and 21.2 g/hr respectively. Hydrogen concentration at the gas phase of the reactor was controlled at 600 volppm by the continuous feed of hydrogen.

And a controlled amount of the same prepolymerized catalyst as used in PRODUCT EXAMPLE 1 was continuously supplied to the reactor at the feed rate of 7.1 g/hr as bare catalyst (pre-polymer is excluded). The reactor was cooled to hold the reaction temperature at 65° C.

The product propylene-ethylene random copolymer in the first step showed following features: BD (bulk density) 0.47 g/cc, MFR 16.3 g/10 min, ethylene content 2.2 wt %.

Second Step

In the second step, propylene-ethylene random copolymerization was carried out in the gas phase reactor of 0.5 m$^3$ equipped with a stirrer. The reaction mixture including polymer particles was continuously transferred from the liquid pool reactor to the gas phase reactor, with flushing of liquid propylene followed by the compressed by nitrogen.

Reaction conditions were hold as following: reaction temperature at 80° C., total pressure of propylene, ethylene and hydrogen at 1.5 MPa, in which volume fraction of propylene, ethylene and hydrogen were 70.93 vol %, 28.98 vol % and 900 volppm respectively.

As an activity suppressing reagent, a controlled amount of ethanol was supplied to the gas phase reactor. Molar ratio of the supplied ethanol to aluminum as TiBA accompanied with the polymer particles transferred to the gas phase reactor was held at 0.5 mol/mol.

The final propylene-ethylene random block copolymer showed following features: activity 16.3 kg/g-cat, BD (bulk density) 0.40 g/cc, MFR 16.6 g/10 min, ethylene content 7.2 wt %.

Production Examples 3 to 9

A range of propylene-ethylene random block copolymers were prepared just as illustrated in PRODUCTION EXAMPLE 1. The polymerization conditions and results are summarized in TABLE 3.

Production Example 10

A propylene-ethylene random copolymer was prepared with the same prepolymerized catalyst as used in PRODUCT EXAMPLE 1.

3L-autoclave reactor equipped with a stirrer and a thermal controller was sufficiently purged with propylene. 2.76 ml of n-heptane solution of triisobutyl aluminum (2.02 mmol), 38 g of ethylene, 80 ml of hydrogen and 750 g of liquid propylene were introduced to this reactor respectively, and the reactor temperature was raised to and held at 45° C. Polymerization was started with pressure-assisted introduction of 45 mg (prepolymer is excluded) of the prepolymerized catalyst described in PRODUCTION EXAMPLE 1 in suspension in n-heptane. During polymerization of 75 min. the reactor temperature was kept at 45° C. After quenched with 10 ml of ethanol, a remaining monomer was purged to the normal pressure, and the reactor atmosphere was completely replaced with purified nitrogen. A recovered polymer product was sufficiently dried in an oven. The results were following: yield 209 g, activity 4.6 kg/g-cat, ethylene content 3.7 wt %, MFR 16.3 g/10 min.

Production Examples 11 to 16

A range of propylene-ethylene random block copolymers were prepared just as illustrated in PRODUCTION EXAMPLE 1. The polymerization conditions and results are summarized in TABLE 4.

Production Example 17

Propylene-ethylene random block copolymerization was carried out as illustrated in PRODUCTION EXAMPLE 1, except that 70 g of ethylene and reaction temperature of 45° C. were employed in the first step. Because stirring of the reactor had a heavy trouble when purging of a remaining monomer at the end of the first step, polymerization was emergency shut-down before starting the second step. When the autoclave was opened, serious fouling of sticky polymer was found. By analysis, ethylene content in a piece of the fouled polymer was up to 70 wt %.

Production Example 18 and 19

2,000 ml of dried and deoxidized n-heptane was charged into a glass-flask sufficiently purged with nitrogen. 2.6 mol of $MgCl_2$ and 5.2 mol of $Ti(OBu)_4$ were introduced therein and reacted at 95° C. for 2 hours. After the reaction mixture was cooled to 40° C., 320 ml of methyl hydrogen poly-siloxane (20 cs) was introduced into the flask, and stirred for 3 hours. Produced solid particles were washed with n-heptane.

4,000 ml of n-heptane purified as described above was charged into a glass-flask sufficiently purged with nitrogen. The solid particles formed above were measured off equivalent to 1.46 mol of Mg, and were introduced to the flask. Then a mixture of 2.62 mol of $SiCl_4$ and 25 ml of n-heptane was dropped into the flask at 30° C. for half an hour, and reacted at 70° C. for 3 hours, followed by washing with n-heptane. Thereafter a mixture of 0.15 mol of phthalyl chloride and 25 ml of n-heptane was dropped into the flask at 70° C. for half an hour, and reacted at 90° C. for an hour, followed by washing with n-heptane. And then 11.4 mol of $TiCl_4$ was introduced to the flask and reacted at 110° C. for 3 hours, followed by washing with n-heptane. The solid component(A1) was obtained, which had a titanium content of 2.0 wt %.

200 ml of n-heptane purified as described above was charged into a glass-flask sufficiently purged with nitrogen. 4 g of the solid component(A1) synthesized above was introduced into the flask. 0.035 mol of $SiCl_4$ was introduced therein and reacted at 90° C. for 2 hours. Without washing, 0.006 mol of $(CH_2=CH)-Si(CH_3)_3$, 0.003 mol of $(t-C_4H_9)(CH_3)Si(OCH_3)_2$ and 0.016 mol of $Al(C_2H_5)_3$ were introduced into the flask respectively, and reacted at 30° C. for 2 hours. The crude products were sufficiently washed with n-heptane to give a solid catalyst component(A) containing of $MgCl_2$ as a major component. This product had a titanium content of 1.8 wt %. (The above catalyst preparation procedure was referred to EXAMPLE 1 in JP-A-11-80235.)

With this catalyst component(A), propylene-ethylene random block copolymers were prepared just as illustrated in PRODUCTION EXAMPLE 1 except for the use of n-heptane solution of triethyl aluminum (4.82 mmol) instead of that of triisobutyl aluminum. The polymerization conditions and results are summarized in TABLE 5.

TABLE 3

| | | | | Production Conditions | | | | | | | |
|---|---|---|---|---|---|---|---|---|---|---|---|
| | | | | | Production Example 3 | Production Example 4 | Production Example 5 | Production Example 6 | Production Example 7 | Production Example 8 | Production Example 9 |
| Polymerization Conditions | 1st Stage | Catalyst Amount (Pre-polymer is excluded) | mg | | 25 | 35 | 25 | 35 | 35 | 35 | 45 |
| | | Temp | ° C. | | 45 | 45 | 45 | 45 | 45 | 45 | 45 |
| | | Time | min | | 15 | 75 | 75 | 75 | 75 | 75 | 75 |
| | | Introduced Hydrogen | ml | | 100 | 80 | 80 | 80 | 80 | 35 | 12 |
| | | Introduced Ethylene | g | | 55 | 38 | 38 | 38 | 38 | 38 | 38 |
| | 2nd Stage | Temp | ° C. | | 80 | 80 | 80 | 80 | 80 | 80 | 80 |
| | | Pressure | MPaG | | 2.5 | 2.5 | 2.5 | 2.5 | 2.5 | 2.5 | 2.5 |
| | | Time | min | | 81 | 19 | 52 | 34 | 25 | 54 | 67 |
| | | Ethylene Concentration in Feed Gas | vol % | | 36.94 | 32.95 | 32.95 | 27.96 | 37.94 | 32.95 | 32.95 |
| | | Propylene Concentration in Feed | vol % | | 62.91 | 66.9 | 66.9 | 71.89 | 61.91 | 67 | 67.05 |

TABLE 3-continued

| | | | Production Conditions | | | | | | |
|---|---|---|---|---|---|---|---|---|---|
| | | | Production Example 3 | Production Example 4 | Production Example 5 | Production Example 6 | Production Example 7 | Production Example 8 | Production Example 9 |
| | | Hydrogen Concentration in Feed Gas | vol % | 0.15 | 0.15 | 0.15 | 0.15 | 0.15 | 0.05 | 0 |
| Polymerization Results | After 1st Stage | Ethylene Content | wt % | 5.2 | 3.7 | 3.7 | 3.7 | 3.7 | 3.7 | 3.7 |
| | | MFR | g/10 min | 16.3 | 16.3 | 16.3 | 16.3 | 16.3 | 3.8 | 0.7 |
| | After 2nd Stage | Ethylene Content | wt % | 10.2 | 7.7 | 10.2 | 7.7 | 9.7 | 8.7 | 8.7 |
| | | MFR | g/10 min | 16.6 | 16.6 | 16.6 | 16.6 | 16.6 | 2.3 | 0.6 |
| | | Yield | g | 341 | 275 | 334 | 326 | 334 | 304 | 296 |
| | | Activity | kg/g-Catalyst | 13.6 | 7.9 | 13.4 | 9.3 | 9.5 | 8.7 | 6.6 |

TABLE 4

| | | | | Production Conditions | | | | | |
|---|---|---|---|---|---|---|---|---|---|
| | | | | Production Example 11 | Production Example 12 | Production Example 13 | Production Example 14 | Production Example 15 | Production Example 16 |
| Polymerization Conditions | 1st Stage | Catalyst Amount (Pre-polymer is excluded) | mg | 45 | 45 | 35 | 35 | 40 | 40 |
| | | Temp | ° C. | 45 | 45 | 45 | 45 | 70 | 70 |
| | | Time | min | 75 | 15 | 75 | 75 | 60 | 20 |
| | | Introduced Hydrogen | ml | 80 | 80 | 80 | 80 | 200 | 200 |
| | | Introduced Ethylene | g | 38 | 38 | 38 | 38 | 0 | 0 |
| | 2nd Stage | Temp | ° C. | 80 | 80 | 80 | 80 | 80 | 80 |
| | | Pressure | MPaG | 2.5 | 2.5 | 2.5 | 2.5 | 2 | 2.5 |
| | | Time | min | 5 | 20 | 41 | 22 | 38 | 70 |
| | | Ethylene Concentration in Feed Gas | vol % | 32.95 | 32.95 | 19.97 | 46.93 | 22.97 | 22.97 |
| | | Propylene Concentration in Feed Gas | vol % | 66.9 | 66.9 | 79.88 | 52.92 | 76.88 | 76.88 |
| | | Hydrogen Concentration in Feed Gas | vol % | 0.15 | 0.15 | 0.15 | 0.15 | 0.15 | 0.15 |
| Polymerization Results | After 1st Stage | Ethylene Content | wt % | 3.7 | 3.7 | 3.7 | 3.7 | 0 | 0 |
| | | MFR | g/10 min | 16.3 | 16.3 | 16.3 | 16.3 | 16.3 | 16.3 |
| | After 2nd Stage | Ethylene Content | wt % | 5.2 | 11.7 | 5.7 | 11.7 | 5 | 8 |
| | | MFR | g/10 min | 16.6 | 16.6 | 16.6 | 16.6 | 16.6 | 16.6 |
| | | Yield | g | 247 | 278 | 330 | 331 | 302 | 349 |
| | | Activity | kg/g-Catalyst | 5.5 | 6.2 | 9.4 | 9.5 | 7.6 | 8.7 |

TABLE 5

| | | | | Production Conditions | |
|---|---|---|---|---|---|
| | | | | Production Example 18 | Production Example 19 |
| Polymerization Conditions | 1st Stage | Catalyst Amount (Pre-polymer is excluded) | mg | 10 | 10 |
| | | Temp | ° C. | 60 | 60 |
| | | Time | min | 20 | 20 |
| | | Introduced Hydrogen | ml | 2000 | 300 |
| | | Introduced Ethylene | g | 10 | 10 |
| | 2nd Stage | Temp | ° C. | 80 | 80 |
| | | Pressure | MPaG | 2 | 2 |
| | | Time | min | 38 | 34 |
| | | Ethylene Concentration in Feed Gas | vol % | 19.92 | 19.92 |
| | | Propylene Concentration in Feed Gas | vol % | 79.68 | 80.03 |
| | | Hydrogen Concentration in Feed Gas | vol % | 0.4 | 0.05 |
| Polymerization Results | After 1st Stage | Ethylene Content | wt % | 3.7 | 3.7 |
| | | MFR | g/10 min | 1.3 | 0.1 |
| | After 2nd Stage | Ethylene Content | wt % | 8.7 | 8.7 |

TABLE 5-continued

| | | Production Conditions | | |
|---|---|---|---|---|
| | | | Production Example 18 | Production Example 19 |
| Stage | MFR | g/10 min | 2.3 | 0.6 |
| | Yield | g | 370 | 339 |
| | Activity | kg/g-Catalyst | 37.0 | 33.9 |

By optionally repeating the above polymerization depending on need, at least 2 kg of a polymer powder was produced and the following evaluation was carried out. EXAMPLE 1 Evaluation of random block copolymer The following additives were added to the random block copolymer powder obtained in Production Example 1.

(Additives)

Antioxidant: 500 ppm of tetrakis[methylene-3-(3',5'-di-t-butyl-4'-hydroxyphenyl)propionate]methane and 500 ppm of tris(2,4-di-t-butylphenyl)phosphite Neutralizing agent: Calcium stearate 500 ppm (Pelletization)

Pellets were obtained by melt-extrusion of a copolymer powder under the following conditions.

Extruduates from strand die were quenched in water and cut by a strand cutter into a diameter of about 2 mm and a length of about 3 mm.

Extruder: KZW-15-45-MG twin screw extruder manufactured by Technovel Corporation Screw: Diameter 15 mm, L/D=45 (L:length,D:Diameter)

Extruder set temperature: (hopper side) 40° C., 80° C., 160° C., 200° C., 220° C. and 220° C. (die side)

Screw rotation number: 400 rpm

Extruding rate: 1.5 kg/h adjusted by a screw feeder

Die: Diameter 3 mm strand die, hole number=2

(Measurement)

Measurement of TREF, DSC, GPC, CXS and [η] was carried out for the above-obtained pellets. Respective numerical values obtained by the measurement are shown in Table 6.

With regard to TREF measurement results, respective measured numerical values were obtained as illustrated in FIG. 1.

(Molding)

The above-obtained pellets were injection-molded under the following conditions to obtain flat plate test pieces for measuring physical properties.

Standard number: JIS-7152 (ISO294-1)

Molding machine: TU-15 injection-molding machine manufactured by Toyo machinery & metal Co., Ltd.

Molding machine set temperature: (hopper side) 80, 80, 160, 200, 200 and 200° C. (nozzle side)

Mold temperature: 40° C.

Injection speed: 200 mm/sec (speed in a mold cavity)

Injection pressure: 800 kgf/cm$^2$

Maintenance pressure: 800 kgf/cm$^2$

Pressure maintaining time: 40 sec.

Mold shape: Flat plate (thickness 2 mm, width 30 mm and length 90 mm)

(DMA)

DMA of block copolymer was carried out for the above-obtained plate. The results are shown in Table 6. With regard to the results, G', G" and tan δ dependence on temperature are illustrated in FIG. 2 in order to evaluate Tg.

(Evaluation of Physical Properties)

The physical properties of the random block copolymer were evaluated with regard to the following items. The results are shown in Table 7.

i) Transparency

Transparency was evaluated under the following conditions for injection-molded plate.

Standard number: JIS K-7361-1

Instrument: Haze-meter NDH2000 (manufactured by NIPPON DENSHOKU INDUSTRIES CO., LTD.)

Thickness of test piece: 2 mm

Conditioning atmosphere: 24 hours at 23° C. and 50% humidity.

Number of test pieces: 3

Evaluation item: Haze and total light transmittance (TT)

ii) Flexural test

Flexural properties were evaluated under the following conditions.

Standard number: JIS K-7171 (ISO178)

Instrument: Autograph AG-20kNG (manufactured by Shimadzu Corporation)

Sampling direction of test piece: Flowing direction

Shape of test piece: thickness 2.0 mm, width 25.0 mm and length 40.0 mm

Preparation method of test piece: Punching out the injection-molded flat plate to the above size.

Conditioning atmosphere: 24 hours at 23° C. and 50% humidity.

Test atmosphere: 23° C. and 50% humidity.

Number of test pieces: 5

Distance between fulcrums: 32.0 mm

Test speed: 1.0 mm/min

Evaluation item: Flexural modulus and Flexural strength (maximum flexural stress)

iii) Tensile Test

Tensile properties were evaluated under the following conditions.

Standard number: JIS K-7162 (ISO 527-1)

Instrument: Autograph AG-5KNG equipped with extension indicator (manufactured by Shimadzu Corporation)

Sampling direction of test piece: Flowing direction

Shape of test piece: JIS K7162-5A shape

Preparation method of test piece: Punching out the injection-molded flat plate into the above shape.

Conditioning atmosphere: 24 hours at 23° C. and 50% humidity.

Test atmosphere: 23° C. and 50% humidity.

Number of test pieces: 5

Test speed: 1.0 mm/min (<5 mm elongation) and 25.0 mm/min (>5 mm elongation)

Evaluation item: Tensile modulus, tensile stress at yield, tensile stress at break and tensile strain at break iv) Impact Test Impact resistance was evaluated by tensile-impact test under the following conditions.

Instrument: Thermopulser high speed impact test machine EHF-2H-20L type equipped with a thermostatic chamber (manufactured by Shimadzu Corporation)

Sampling direction of test piece: Flowing direction

Shape of test piece: JIS K7162-5A shape

Preparation method of test piece: Punching out the injection-molded flat plate into the above shape.

Conditioning atmosphere: 24 hours at 23° C. and 50% humidity.

Number of test pieces: 5

Tensile speed: 2 m/sec

Measurement temperature: 23° C. and 0° C.

Evaluation item: Tensile strain at break and tensile impact energy (area of elongation-load curve)

v) Heat Resistance

Vicat softening temperature was evaluated under the following conditions.

Standard number: JIS K-7206 (in accordance with 50 method except that 250 g of a load was employed)

Instrument: Automatic HDT (manufactured by TOYO SEIKI CO., LTD.)

Shape of test piece: Doubled injection-molded flat plates having thickness of 2 mm Conditioning atmosphere: 24 hours at 23° C. and 50% humidity.

Test load: 250 g

Temperature rising rate: 50° C./hr

Number of test pieces: 3 vi) Evaluation of Stickiness

Stickiness was evaluated in accordance with the following method.

Two injection-molded flat plates were sandwiched between iron plates, on which a load of 1 kg was applied, and a test sample thus obtained was held under the condition of 23° C. and a humidity of 50% for 10 min. Thereafter, the test sample was taken out from the iron plates to evaluate stickiness.

In Table 7, evaluation mark ○ indicates that the two test pieces did not stick and were easily separated from each other.

Evaluation mark Δ indicates that the two test pieces stuck to each other but could be separated easily by hand (however, it is apprehended to cause a blocking for practical use as a film).

Evaluation mark X indicates that the two test pieces firmly stuck to each other.

vii) Evaluation of Bleed-out

Bleed-out was evaluated in accordance with the following method.

The surface of a test piece obtained by injection-molding was cleanly wiped with a cloth within 24 hours after molding, and the test piece was held under the condition of 40° C. for 24 hours in a thermostatic chamber. Then, bleed-out was evaluated by eye.

In Table 7, evaluation mark ○ indicates that there was no bleed-out on the test sample, there was no change after conditioning.

Evaluation mark Δ indicates that bleed-out on the test sample was slightly observed but was not remarkable (however, it is apprehended to cause a problem for practical use as a film).

The evaluation mark X indicates that bleed-out was remarkable and whitening was caused on the surface.

Examples 2 to 7

The random block copolymers obtained respectively by Production Examples 2 to 7 were blended with the same additives as employed in Example 1, and were pelletized and injection-molded under the same conditions as in Example 1. Their characteristics and physical properties were evaluated in the same way of Example 1, and the results are also shown in the Tables 6 and 7.

Example 8

The random block copolymer obtained by Production Example 8 was blended with the same additives as employed in Example 1. In pelletization, a shark skin was appeared on a strand surface under the same conditions as in Example 1, so temperature of two zones of die side was changed to 230° C. In injection-molding, under the same conditions as in Example 1 sink marks appeared and uniform thickness was not obtained. Therefore, the retaining pressure was changed to 1,200 kgf/cm$^2$. Its characteristics and physical properties were evaluated in the same way of Example 1, and the results are also shown in the Tables 6 and 7.

Example 9

The random block copolymer obtained by Production Example 9 was blended with the same additives as employed in Example 1. In pelletization, a shark skin was appeared on a strand surface and motor load was increased under the same conditions as in Example 8, an extruding rate was reduced to 1.0 kg/h. In injection-molding, under the same conditions as in Example 8 sink marks appeared and uniform thickness was not obtained. Therefore, the retaining pressure was changed to 2,000 kgf/cm$^2$, but flow mark was caused on the surface and a satisfactory sample could not be obtained. Its characteristics and physical properties were evaluated in the same way of Example 1, and the results are also shown in the Tables 6 and 7.

Comparative Examples 1 to 7

The random copolymer obtained by Production Example 10 and the block copolymers obtained respectively by Production Examples 11 to 16 were blended with the same additives as employed in Example 1, and were pelletized and injection-molded under the same conditions as in Example 1. Their characteristics and physical properties were evaluated in the same way of Example 1, and the results are also shown in the Tables 6 and 7.

DMA of block copolymer was carried out in the same way of Example 1. The results are shown in Table 6. The DMA result of Comparative Example 5 is illustrated in FIG. 3 as an example of phase-separated structure.

Comparative Example 8

The random block copolymer obtained by Production Example 18 was blended with the same additives as employed in Example 1. In pelletization, a shark skin was appeared on a strand surface under the same conditions as in Example 1, so temperature of two zones of die side was changed to 230° C. In injection-molding, under the same conditions as in Example 1 sink marks appeared and uniform thickness was not obtained. Therefore, the retaining pressure was changed to 1,200 kgf/cm$^2$. Its characteristics and physical properties were evaluated in the same way of Example 1, and the results are also shown in the Tables 6 and 7.

Comparative Example 9

The block copolymer obtained by Production Example 19 was blended with the same additives as employed in Example 1. In pelletization, a shark skin was appeared on a strand surface and motor load was increased under the same conditions as in Comparative Example 8, an extruding rate was reduced to 1.0 kg/h. In injection-molding, under the same conditions as in Comparative Example 8 sink marks appeared and uniform thickness was not obtained. Therefore, the retaining pressure was changed to 2,000 kgf/cm², but flow mark was caused on the surface and a satisfactory sample could not be obtained. Its characteristics and physical properties were evaluated in the same way of Example 1, and the results are also shown in the Tables 6 and 7.

Comparative Example 10

The random block copolymer obtained by Production Example 19 was blended with the same additives as employed in Example 1 and 0.05 part by weight of 2,5-dimethyl-2,5-bis(t-butylperoxy)hexane as an organic peroxide. The mixture was supplied to the same twin screw extruder as employed in Example 1, and was melt-extruded at a cylinder temperature of 200° C. and a screw rotation number of 200 rpm, and was then cut into strands to obtain rheology-controlled pellets.

The pellets thus obtained had a strong smell of decomposed compounds of the organic peroxide, and had a yellowish hue. MFR was 5.0 g/10 min.

The pellets thus obtained were injection-molded under the same conditions as in Example 1. Its characteristics and physical properties were evaluated in the same way of Example 1, and the results are also shown in the Tables 6 and 7.

TABLE 6

Various Analytical Evaluations Results

| Measurement | | Parameter | Unit | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|
| TREF | T(A) | Peak Temp. of Comp(A) | ° C. | 76.4 | 86.5 | 66.2 | 76.4 | 76.4 | 76.4 | 76.4 | 76.4 | 76.4 |
| | H(A) | TREF Hight at T(A) | dwt %/dT | 7.0 | 9.4 | 4.0 | 8.4 | 4.9 | 7.0 | 7.0 | 7.0 | 7.0 |
| | T(D) | 99 wt % Elution Temp. | ° C. | 79.5 | 89.0 | 70.3 | 79.8 | 79.0 | 79.5 | 79.5 | 79.5 | 79.5 |
| | T(B) | Peak Temp. of Comp(B) | ° C. | 23.6 | 25.4 | 21.8 | 23.6 | 23.6 | 26.0 | 21.2 | 23.6 | 23.6 |
| | T(C) | (T(A) + T(B))/2 | ° C. | 50.0 | 56.0 | 44.0 | 50.0 | 50.0 | 51.2 | 48.8 | 50.0 | 50.0 |
| | H(C) | TREF Hight at T(C) | dwt %/dT | 0.21 | 0.21 | 0.21 | 0.21 | 0.21 | 0.33 | 0.13 | 0.21 | 0.21 |
| | H(C)/H(A) | | | 0.03 | 0.02 | 0.05 | 0.03 | 0.04 | 0.05 | 0.02 | 0.03 | 0.03 |
| | W(B) | Weight Fraction of Comp(B) | wt % | 50 | 50 | 50 | 40 | 65 | 50 | 50 | 50 | 50 |
| | W(A) | Weight Fraction of Comp(A) | wt % | 50 | 50 | 50 | 60 | 35 | 50 | 50 | 50 | 50 |
| NMR | [E]A | Etylene Content of Comp(A) | wt % | 3.7 | 2.2 | 5.2 | 3.7 | 3.7 | 3.7 | 3.7 | 3.7 | 3.7 |
| | [E]B | Etylene Content of Comp(B) | wt % | 13.7 | 12.2 | 15.2 | 13.7 | 13.7 | 11.7 | 15.7 | 13.7 | 13.7 |
| | [E]gap | [E]B − [E]A | wt % | 10.0 | 10.0 | 10.0 | 10.0 | 10.0 | 8.0 | 12.0 | 10.0 | 10.0 |
| | [E]w | Etylene Content of Block copolymer | wt % | 8.7 | 7.2 | 10.2 | 7.7 | 10.2 | 7.7 | 9.7 | 8.7 | 8.7 |
| DMA | Tg | Glass Transition Temperature | ° C. | −16 | −14 | −19 | −14 | −19 | −13 | −20 | −16 | −16 |
| DSC | Tm | Melting Point | ° C. | 123 | 133 | 113 | 123 | 123 | 123 | 123 | 123 | 123 |
| | dHm | Heat of Fusion | mJ/mg | 31 | 38 | 26 | 37 | 21 | 35 | 31 | 31 | 31 |
| GPC | Mw | Weight Average Moleculer Weight | ×10⁵ | 2.0 | 2.0 | 2.0 | 2.0 | 2.0 | 2.0 | 2.0 | 3.5 | 5.0 |
| | Mn | Number Average Moleculer Weight | ×10⁴ | 7.7 | 7.7 | 7.7 | 7.7 | 7.7 | 7.7 | 7.7 | 12.9 | 19.2 |
| | W(Mw ≦ 5000) | Weight Fraction of Mw ≦ 5000 | wt % | 0.4 | 0.4 | 0.4 | 0.4 | 0.4 | 0.4 | 0.4 | 0.2 | 0.1 |
| CXS | | 23° C. Xylene Soluble | wt % | 48 | 48 | 48 | 38 | 62 | 48 | 48 | 48 | 48 |
| [η]cxs | | Intrinsic Viscosity of CXS | dl/g | 1.5 | 1.5 | 1.5 | 1.5 | 1.5 | 1.5 | 1.5 | 2.5 | 3.0 |

| Measurement | | Parameter | Unit | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 | C. Ex. 10 |
|---|---|---|---|---|---|---|---|---|---|---|---|---|---|
| TREF | T(A) | Peak Temp. of Comp(A) | ° C. | 76.4 | 76.4 | 76.4 | 76.4 | 76.4 | 101.0 | 101.0 | 95.4 | 95.4 | 95.4 |
| | H(A) | TREF Hight at T(A) | dwt %/dT | 14.0 | 11.9 | 2.8 | 7.0 | 7.0 | 9.9 | 4.0 | 4.5 | 4.5 | 4.5 |
| | T(D) | 99 wt % Elution Temp. | ° C. | 80.8 | 80.4 | 78.4 | 79.5 | 79.5 | 103.3 | 102.5 | 101.0 | 101.0 | 101.0 |
| | T(B) | Peak Temp. of Comp(B) | ° C. | — | 23.6 | 23.6 | 49.6 | 16.4 | 34.0 | 34.0 | 9.0 | 9.0 | 9.0 |
| | T(C) | (T(A) + T(B))/2 | ° C. | — | 50.0 | 50.0 | 63.0 | 46.4 | 67.5 | 67.5 | 52.2 | 52.2 | 52.2 |

TABLE 6-continued

Various Analytical Evaluations Results

| | | | | | | | | | | | | |
|---|---|---|---|---|---|---|---|---|---|---|---|---|
| | H(C) | TREF Hight at T(C) | dwt %/dT | — | 0.210 | 0.210 | 0.836 | 0.053 | 0.210 | 0.210 | 0.294 | 0.294 | 0.294 |
| | H(C)/H(A) | | | | 0.018 | 0.075 | 0.120 | 0.008 | 0.021 | 0.053 | 0.065 | 0.065 | 0.065 |
| | W(B) | Weight Fraction of Comp(B) | wt % | — | 15 | 80 | 50 | 50 | 50 | 80 | 50 | 50 | 50 |
| | W(A) | Weight Fraction of Comp(A) | wt % | — | 85 | 20 | 50 | 50 | 50 | 20 | 50 | 50 | 50 |
| NMR | [E]A | Etylene Content of Comp(A) | wt % | 3.7 | 3.7 | 3.7 | 3.7 | 3.7 | 0.0 | 0.0 | 3.7 | 3.7 | 3.7 |
| | [E]B | Etylene Content of Comp(B) | wt % | — | 13.7 | 13.7 | 7.7 | 19.7 | 10.0 | 10.0 | 13.7 | 13.7 | 13.7 |
| | [E]gap | [E]B − [E]A | wt % | — | 10.0 | 10.0 | 4.0 | 16.0 | 10.0 | 10.0 | 10.0 | 10.0 | 10.0 |
| | [E]w | Etylene Content of Block copolymer | wt % | 3.7 | 5.2 | 11.7 | 5.7 | 11.7 | 5.0 | 8.0 | 8.7 | 8.7 | 8.7 |
| DMA | Tg | Glass Transition Temperature | °C. | 2 | −6 | −21 | −5 | −0.3 −38.2 | −9 | −12 | −16 | −16 | −16 |
| DSC | Tm | Melting Point | °C. | 123 | 123 | 123 | 123 | 123 | 148 | 148 | 139 | 139 | 139 |
| | dHm | Heat of Fusion | mJ/mg | 61 | 52 | 12 | 48 | 31 | 52 | 32 | 38 | 38 | 38 |
| GPC | Mw | Weight Average Moleculer Weight | ×10$^5$ | 2.0 | 2.0 | 2.0 | 2.0 | 2.0 | 2.0 | 2.0 | 3.5 | 5.0 | 2.8 |
| | Mn | Number Average Moleculer Weight | ×10$^4$ | 7.7 | 7.7 | 7.7 | 7.7 | 7.7 | 7.7 | 7.7 | 7.6 | 10.9 | 6.7 |
| | W(Mw ≦ 5000) | Weight Fraction of Mw ≦ 5000 | wt % | 0.4 | 0.4 | 0.4 | 0.4 | 0.4 | 0.4 | 0.4 | 0.9 | 0.5 | 0.5 |
| CXS | | 23° C. Xylene Soluble | wt % | 0 | 14 | 77 | 48 | 48 | 48 | 77 | 40 | 40 | 40 |
| [η]cxs | | Intrinsic Viscosity of CXS | dl/g | — | 1.5 | 1.5 | 1.5 | 1.5 | 1.5 | 1.5 | 2.0 | 2.0 | 3.0 |

TABLE 7

Various Physical Property Evaluation Results of Injection-molded test piece

| Evaluation | Evaluation Properties | Unit | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Transparency | Haze | % | 40 | 49 | 32 | 46 | 32 | 46 | 35 | 40 | 40 |
| | Total luminous transmittance | % | 89 | 89 | 90 | 89 | 90 | 89 | 89 | 89 | 89 |
| Flexural Properties | Flexural Modulus | MPa | 215 | 304 | 151 | 271 | 152 | 271 | 171 | 215 | 215 |
| | Flexural Strength | MPa | 7.2 | 10.1 | 5.0 | 9.0 | 5.1 | 9.0 | 5.7 | 7.2 | 7.2 |
| Tensile Properties | Modulus of elasiticity in tension | MPa | 151 | 213 | 106 | 190 | 107 | 190 | 120 | 151 | 151 |
| | Tensile Stress at Yield | MPa | 9.8 | 12.0 | 8.0 | 11.2 | 8.0 | 11.2 | 8.6 | 9.8 | 9.8 |
| | Tensile Stress at Break | MPa | 18 | 20 | 16 | 20 | 16 | 20 | 17 | 18 | 18 |
| | Tensile Strain at Break | % | 526 | 565 | 487 | 552 | 487 | 552 | 500 | 526 | 526 |
| Impact Strenght at 23° C. | Tensile Strain at Break | % | 538 | 418 | 501 | 472 | 503 | 472 | 533 | 300 | 205 |
| | Tensile Impact Energy | J | 13.2 | 10.7 | 12.4 | 11.8 | 12.5 | 11.8 | 13.1 | 8.3 | 6.3 |
| Impact Strenght at 0° C. | Tensile Strain at Break | % | 114 | 84 | 149 | 94 | 148 | 94 | 136 | 114 | 114 |
| | Tensile Impact Energy | J | 5.3 | 4.6 | 6.1 | 4.8 | 6.1 | 4.8 | 5.8 | 5.3 | 5.3 |
| Softening Temperature | Vicat Softening Temperature | °C. | 112 | 120 | 106 | 113 | 109 | 113 | 109 | 113 | 113 |
| Stickiness | | | ◯ | ◯ | ◯ | ◯ | ◯ | ◯ | ◯ | ◯ | ◯ |
| Bleedout | | | ◯ | ◯ | ◯ | ◯ | ◯ | ◯ | ◯ | ◯ | ◯ |

| Evaluation | Evaluation Properties | Unit | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 | C. Ex. 10 |
|---|---|---|---|---|---|---|---|---|---|---|---|---|
| Transparency | Haze | % | 68 | 60 | 24 | 57 | 99 | 61 | 44 | 79 | 79 | 79 |
| | Total luminous transmittance | % | 88 | 88 | 90 | 89 | 52 | 88 | 90 | 86 | 86 | 86 |
| Flexural Properties | Flexural Modulus | MPa | 681 | 482 | 108 | 429 | 108 | 501 | 251 | 374 | 374 | 374 |
| | Flexural Strength | MPa | 22.7 | 16.1 | 3.6 | 14.3 | 3.6 | 16.7 | 8.4 | 12.5 | 12.5 | 12.5 |
| Tensile Properties | Modulus of elasiticity in tension | MPa | 476 | 337 | 75 | 301 | 75 | 351 | 176 | 262 | 262 | 262 |
| | Tensile Stress at Yield | MPa | 19.2 | 15.7 | 6.5 | 14.7 | 6.5 | 16.1 | 10.7 | 15.1 | 15.1 | 15.1 |
| | Tensile Stress at Break | MPa | 27 | 24 | 14 | 23 | 14 | 24 | 19 | 22 | 22 | 22 |
| | Tensile Strain at Break | % | 656 | 617 | 448 | 604 | 448 | 622 | 544 | 444 | 444 | 340 |
| Impact Strenght at 23° C. | Tensile Strain at Break | % | 51 | 112 | 220 | 338 | 491 | 236 | 501 | 98 | 125 | 111 |
| | Tensile Impact Energy | J | 3.1 | 4.3 | 6.6 | 9.0 | 12.2 | 6.9 | 12.4 | 4.0 | 4.6 | 4.3 |
| Impact Strenght at 0° C. | Tensile Strain at Break | % | 18 | 51 | 187 | 59 | 187 | 49 | 100 | 52 | 52 | 52 |
| | Tensile Impact Energy | J | 2.1 | 3.6 | 6.8 | 3.8 | 6.8 | 3.5 | 5.0 | 3.6 | 3.6 | 3.6 |

TABLE 7-continued

Various Physical Property Evaluation Results of Injection-molded test piece

| Softening Temperature | Vicat Softening Temperature | °C. | 114 | 113 | 82 | 112 | 110 | 140 | 98 | 112 | 113 | 112 |
|---|---|---|---|---|---|---|---|---|---|---|---|---|
| Stickiness | | | ○ | ○ | Δ | ○ | Δ | ○ | Δ | X | Δ | Δ |
| Bleedout | | | ○ | ○ | ○ | ○ | ○ | ○ | ○ | X | X | X |

Example 10

Evaluation of Multi-layered Film (Preparation of Random Block Copolymer Composition for Surface Layer)

The following additives were mixed with the random block copolymer powder obtained by Production Example 1.

(Additives)

Antioxidant: 500 ppm of tetrakis[methylene-3-(3',5'-di-t-butyl-4'-hydroxyphenyl)propionate]methane and 500 ppm of tris(2,4-di-t-butylphenyl)phosphite Neutralizing agent: 500 ppm of calcium stearate Anti-blocking agent: 2,000 ppm of methyl polymethacrylate fine particles having an average particle size of 2 μm (Pelletization)

Pelletization was carried out in the same manner as in Example 1.

(Preparation of Polypropylene Composition for Base Layer)

The following additives were mixed with were added to propylene homopolymer powder (Tm=161.5° C.) of MFR=2.4 g/10 min, and the mixture was pelletized.

(Additives)

Antioxidant: 1000 ppm of tetrakis[methylene-3-(3',5'-di-t-butyl-4'-hydroxyphenyl)propionate]methane and 1000 ppm of tris(2,4-di-t-butylphenyl)phosphite Neutralizing agent: 500 ppm of calcium stearate (Production of Biaxially Oriented Multi-layered Film)

The above prepared composition for base layer and the composition for skin layer were supplied to two different extruders and the extruding rates were controlled individually. Both compositions were co-extruded through a T die and rapidly cooled by a cooling roll to give about 1 mm thickness sheet.

The sheet thus obtained was oriented by a tenter system biaxially orienting machine. The sheet was firstly 5 times drawn to MD (machine direction) at 120° C., secondly was preheated to 160° C. and 9 times drawn to TD (transverse direction) at 158° C. with heat setting of 5% relaxation.

The film thus obtained was corona treated so as to apply 41 dyn/cm on the base layer.

The film thickness is adjusted as the total thickness of 20 μm and the skin layer thickness of 2 μm by extruded rates.

(Evaluation of Physical Properties)

Various physical properties of the above produced film were evaluated with regard to the following items. The results are shown in the following Table 8.

Thickness

Total thickness and surface layer thickness were evaluated by electronic microscope.

Haze of Film

Haze of film was measured by ASTM-D-1003.

Anti-blocking Property

The anti-blocking property of the film was evaluated by the following method.

Sample films having a size of 2 cm (width)×15 cm (length) were taken from the above-obtained film. The skin surfaces of two films were single overlapped each other by a length of 5 cm (contact area: 10 cm$^2$) and loaded 0.5 N/cm$^2$ on contact area in an atmosphere of 40° C. for 24 hours. Then, the load was removed and the sample was held at 23° C. for a sufficient time. Thereafter, both ends of lapped film were pulled by a Schopper type tensile tester at 500 mm/min. to determine the force (unit: mN/10 cm$^2$) required to separate by shear. A sample having a smaller value is regarded as having a better anti-blocking property.

Appearance

Appearance of a film was evaluated by eye and summarized in Table 8.

Evaluation mark ○ indicates that no FE was observed on a film, and appearance of the film was satisfactory.

Evaluation mark X indicates some FE were observed on a film.

Heat Sealing Strength

By using a heat sealing bar of 5 mm×200 mm, the obtained two films were heat-sealed at various temperatures so as to have skin surfaces contacted each other under the following condition.

heat sealing pressure: 0.1 Mpa heat sealing time: 1 sec.

heat sealing direction: seal line is vertical to machine direction (MD) of the film A sample having a width of 15 mm was taken from the film thus heat-sealed, and the sample was subjected to a Schopper type tester to separate in the MD direction at a tensile rate of 500 mm/min., and a maximum load to separate was measured as heat sealing strength.

Examples 11 to 14

The biaxially oriented films were produced and evaluated in the same manner as in Example 10, except that the random block copolymers of Production Examples 2 to 5 were used for a surface layer instead of that of Production Example 1 (Examples 11 to 14 respectively correspond to Production Examples 2 to 5). The results are shown in the following Table 8.

Comparative Examples 11 to 17

The biaxially oriented films were produced and evaluated in the same manner as in Example 10, except that the random block copolymers of Production Examples 10 to 15 and 18 were used for a surface layer instead of that of Production Example 1 (Comparative Examples 11 to 17 respectively correspond to Production Examples 10 to 15 and 18). The results are shown in the following Table 8.

TABLE 8

|  |  | Unit | Ex. 10 | Ex. 11 | Ex. 12 | Ex. 13 | Ex. 14 | C. Ex. 11 | C. Ex. 12 | C. Ex. 13 | C. Ex. 14 | C. Ex. 15 | C. Ex. 16 | C. Ex. 17 |
|---|---|---|---|---|---|---|---|---|---|---|---|---|---|---|
| Heat Seal Strength | Heat Seal Temperature |  |  |  |  |  |  |  |  |  |  |  |  |  |
|  | 110° C. | [g/15 mm] |  |  |  | 250 |  |  |  |  |  |  |  |  |
|  | 115° C. |  | 110 |  | 680 | 210 | 160 | 20 | 150 | 10 | 50 | 10 |  |  |
|  | 120° C. |  | 360 | 20 | 760 | 330 | 340 | 350 | 260 | 320 | 390 | 330 |  |  |
|  | 125° C. |  | 690 | 270 | 730 | 550 | 690 | 470 | 440 | 690 | 560 | 470 |  |  |
|  | 130° C. |  | 770 | 460 | 760 | 610 | 780 | 480 | 470 | 770 | 510 | 490 |  | 120 |
|  | 135° C. |  | 770 | 660 | 760 | 640 | 760 | 470 | 500 | 760 | 530 | 490 | 80 | 320 |
|  | 140° C. |  | 780 | 690 |  | 610 | 770 | 440 | 550 | 770 | 550 | 490 | 150 | 570 |
|  | 145° C. |  | 760 | 690 |  | 620 | 780 | 450 | 530 | 760 | 550 | 480 | 490 | 600 |
|  | 150° C. |  |  | 690 |  |  |  |  | 520 | 760 | 540 | 490 | 750 | 550 |
|  | 155° C. |  |  | 690 |  |  |  |  |  |  |  |  | 770 |  |
|  | 160° C. |  |  |  |  |  |  |  |  |  |  |  | 760 |  |
| Thickness | Core | [μm] | 18 | 18 | 18 | 18 | 18 | 18 | 18 | 18 | 18 | 18 | 18 | 18 |
|  | Skin | [μm] | 2 | 2 | 2 | 2 | 2 | 2 | 2 | 2 | 2 | 2 | 2 | 2 |
| Blocking |  | [mN/10 cm$^2$] | 20 | 25 | 26 | 20 | 23 | 18 | 15 | 420 | 20 | 23 | 18 | 32 |
| Haze |  | [%] | 2.2 | 2.4 | 2.1 | 2.2 | 2.1 | 2 | 2.4 | 2.3 | 2.6 | 21 | 2.5 | 3.5 |
| F.E |  |  | ○ | ○ | ○ | ○ | ○ | ○ | ○ | ○ | ○ | ○ | ○ | X |

Production Examples 20 and 21

Propylene-ethylene random block copolymers were prepared just as illustrated in Production Example 1. Polymerization conditions and results are summarized in Table 9.

Production Example 22

Example of Phase-separated Block Copolymer

A propylene-ethylene random block copolymer was prepared just as illustrated as in Production Example 1. Polymerization conditions and results are summarized in Table 9.

TABLE 9

|  |  |  |  | Production Example 20 | Production Example 21 | Production Example 22 |
|---|---|---|---|---|---|---|
| Polymerization Conditions | 1st Stage | Catalyst Amount (Pre-polymer is excluded) | mg | 25 | 22 | 25 |
|  |  | Temp | ° C. | 60 | 60 | 60 |
|  |  | Time | min | 20 | 20 | 20 |
|  |  | Introduced Hydrogen | ml | 350 | 430 | 450 |
|  |  | Introduced Ethylene | g | 18 | 23 | 22 |
|  | 2nd Stage | Temp | ° C. | 80 | 80 | 80 |
|  |  | Pressure | MPaG | 2.5 | 2.5 | 2.5 |
|  |  | Time | min | 56 | 64 | 36 |
|  |  | Ethylene Concentration in Feed Gas | vol % | 19.99 | 20 | 46.99 |
|  |  | Propylene Concentration in Feed Gas | vol % | 79.94 | 79.98 | 52.99 |
|  |  | Hydrogen Concentration in Feed Gas | vol % | 0.07 | 0.02 | 0.02 |
| Polymerization Results | After 1st Stage | Ethylene Content | wt % | 1.7 | 2.1 | 2.0 |
|  |  | MFR | g/10 min | 133 | 139 | 148 |
|  | After 2nd Stage | Ethylene Content | wt % | 5.6 | 5.6 | 10.5 |
|  |  | MFR | g/10 min | 32.0 | 16.7 | 19.6 |
|  |  | Yield | g | 327 | 318 | 316 |
|  |  | Activity | kg/g-Catalyst | 13.1 | 14.4 | 12.6 |

The above each polymerization was optionally repeated to obtain at least 2 kg of polymer powder, and the polymer powder thus obtained was evaluated in the following manner.

Example 15

The random block copolymer powder obtained by Production Example 20 was blended with the same additives as employed in Example 10, and pelletization was carried out under the same conditions. The pellets were evaluated in the same manner as in Example 1.

The results are shown in the flowing Table 10.

TABLE 10

| Measurement | Parameter | | Unit | Ex. 15 | Ex. 18 | C. Ex. 21 |
|---|---|---|---|---|---|---|
| TREF | T(A) | Peak Temp. of Comp(A) | ° C. | 89.6 | 86.9 | 87.6 |
| | H(A) | TREF Hight at T(A) | dwt %/dT | 9.1 | 9.5 | 10.2 |
| | T(D) | 99 wt % Elution Temp. | ° C. | 91.9 | 89.4 | 90.1 |
| | T(B) | Peak Temp. of Comp(B) | ° C. | 40.7 | 40.7 | 16.0 |
| | T(C) | (T(A) + T(B))/2 | ° C. | 65.2 | 63.8 | 51.0 |
| | H(C) | TREF Hight at T(C) | dwt %/dT | 0.39 | 0.43 | 0.03 |
| | H(C)/H(A) | | | 0.04 | 0.05 | 0.00 |
| | W(B) | Weight Fraction of Comp(B) | wt % | 54 | 50 | 47 |
| | W(A) | Weight Fraction of Comp(A) | wt % | 46 | 50 | 53 |
| NMR | [E]A | Etylene Content of Comp(A) | wt % | 1.7 | 2.1 | 2.0 |
| | [E]B | Etylene Content of Comp(B) | wt % | 9 | 9 | 20 |
| | [E]gap | [E]B − [E]A | wt % | 7.3 | 6.9 | 18 |
| | [E]w | Etylene Content of Block copolymer | wt % | 5.6 | 5.6 | 10.5 |
| DMA | Tg | Glass Transition Temperature | ° C. | −7 | −7 | −3 |
| | | | | | | −34 |
| DSC | Tm | Melting Point | ° C. | 136.6 | 133.9 | 134.6 |
| | dHm | Heat of Fusion | mJ/mg | 48.2 | 48.8 | 38.5 |
| GPC | Mw | Weight Average Moleculer Weight | ×10$^5$ | 1.7 | 2.0 | 1.9 |
| | Mn | Number Average Moleculer Weight | ×10$^4$ | 5.8 | 6.7 | 6.1 |
| | W(Mw ≦ 5000) | Weight Fraction of Mw ≦ 5000 | wt % | 0.6 | 0.5 | 0.6 |
| CXS | | 23° C. Xylene Soluble | wt % | 54 | 50 | 47 |
| [η]cxs | | Intrinsic Viscosity of CXS | dl/g | 1.7 | 2.3 | 2.3 |

(Production of Biaxially Oriented Multi-layer Film)

The biaxially oriented films were produced and evaluated in the same manner as in Example 10, except that the random block copolymer of Production Examples 20 was used for a surface layer instead of that of Production Example 1. The results are shown in the following Table 11.

Example 16

The biaxially oriented films were produced and evaluated in the same manner as in Example 10, except that a total thickness and a surface layer thickness were adjusted to 21.8 μm and 3.81 μm respectively. The results are shown in the following Table 11.

Example 17

The biaxially oriented films were produced and evaluated in the same manner as in Example 10, except that a total thickness and a surface layer thickness were adjusted to 22.5 μm and 4.5 μm respectively. The results are shown in the following Table 11.

Example 18

The biaxially oriented films were produced and evaluated in the same manner as in Example 10, except that the random block copolymers of Production Examples 21 was used for a surface layer instead of that of Production Example 10. The results are shown in the following Table 10 and 11.

Example 19

The biaxially oriented films were produced and evaluated in the same manner as in Example 18, except that a total thickness and a surface layer thickness were adjusted to 21.8 μm and 3.8 μm respectively. The results are shown in the following Table 11.

Example 20

The biaxially oriented films were produced and evaluated in the same manner as in Example 18, except that a total thickness and a surface layer thickness were adjusted to 22.5 μm and 4.5 μm respectively. The results are shown in the following Table 11.

Comparative Example 18

The biaxially oriented films were produced and evaluated in the same manner as in Example 10, except that the random copolymers of Production Examples 10 was used for a surface layer instead of that of Production Example 10 and that a total thickness and a surface layer thickness were adjusted to 21.8 μm and 3.8 μm respectively. The results are shown in the following Table 11.

Comparative Example 19

The biaxially oriented films were produced and evaluated in the same manner as in Example 10, except that the composition, which was produced by compounding of 70 wt % of the random copolymers of Production Examples 10 and 30 wt % of the commercially available ethylene-propylene rubber (EPR) (density 0.87 g/ml, MFR=5.4 at 230° C.), was used for a surface layer instead of that of Production Example 10. The results are shown in the following Table 11.

Comparative Example 20

The biaxially oriented films were produced and evaluated in the same manner as in Comparative Example 19, except that a total thickness and a surface layer thickness were adjusted to 21.8 μm and 3.8 μm respectively. The results are shown in the following Table 11.

Comparative Example 21

The biaxially oriented films were produced and evaluated in the same manner as in Example 10, except that the random block copolymers of Production Examples 22 was used for a surface layer instead of that of Production Example 10. The results are shown in the following Table 10 and 11.

Comparative Example 22

The biaxially oriented films were produced and evaluated in the same manner as in Comparative Example 21, except that a total thickness and a surface layer thickness were adjusted to 21.8 μm and 3.8 μm respectively. The results are shown in the following Table 11.

within the range of the present invention. On the contrary, in Comparative Example 7 having a W(B) value higher than the upper limit of the present invention, the transparency and flexibility were improved but heat resistance and stickiness became poor.

In Comparative Examples 8 to 10, the random block copolymers were obtained by a Ziegler-Natta catalyst in the same manner as in the Examples of the present invention. T(A), T(D) and H(C)/H(A) were too high, transparency was poor. Further, in Comparative Example 8, stickiness and bleed-out were poor since W(M<5000) was too high. In Comparative Example 9, stickiness and bleed-out were slightly improved by high [η]cxs but were still unsatisfactory. In Comparative Example 10, rheologically controlled example

TABLE 11

| | | Unit | Ex. 15 | Ex. 16 | Ex. 17 | Ex. 18 | Ex. 19 | Ex. 20 | C. Ex. 18 | C. Ex. 19 | C. Ex. 20 | C. Ex. 21 | C. Ex. 22 |
|---|---|---|---|---|---|---|---|---|---|---|---|---|---|
| Heat Seal Strength | Heat Seal Temperature | | | | | | | | | | | | |
| | 110° C. | [g/15 mm] | | | | | | | | 10 | | | |
| | 115° C. | | | | | | | 10 | 110 | 120 | 160 | | |
| | 120° C. | | 130 | 60 | 50 | 260 | 140 | 130 | 420 | 480 | 610 | 10 | |
| | 125° C. | | 600 | 610 | 720 | 720 | 770 | 840 | 560 | 600 | 740 | 100 | 120 |
| | 130° C. | | 800 | 890 | 990 | 790 | 950 | 1040 | 570 | 630 | 760 | 400 | 490 |
| | 135° C. | | 940 | 1090 | 1290 | 880 | 1130 | 1300 | 570 | 650 | 770 | 460 | 660 |
| | 140° C. | | 1000 | 1200 | 1420 | 960 | 1270 | 1470 | 560 | 620 | 770 | 610 | 710 |
| | 145° C. | | 1030 | 1230 | 1540 | 980 | 1330 | 1500 | 570 | | | 770 | 840 |
| | 150° C. | | 1080 | 1240 | 1520 | 1130 | 1270 | 1540 | | | | 700 | 840 |
| Thickness | Core | [μm] | 18 | 18 | 18 | 18 | 18 | 18 | 18 | 18 | 18 | 18 | 18 |
| | Skin | [μm] | 2 | 3.8 | 4.5 | 2 | 3.8 | 4.5 | 3.8 | 2 | 3.8 | 2 | 3.8 |
| Blocking | | [mN/10 cm²] | 20 | 21 | 22 | 20 | 20 | 21 | 18 | 22 | 22 | 24 | 24 |
| Haze | | [%] | 2.2 | 2.3 | 2.2 | 2.2 | 2.2 | 2.4 | 2 | 18 | 20 | 22 | 23 |

Consideration in Comparison between Examples and Comparative Examples

By comparing the above respective Examples and Comparative Examples, it is evident that a novel propylene-ethylene random block copolymer in the present invention is excellent in transparency and flexibility as expressed by flexural property and tensile property, and reduced bleed-out and stickiness of its product. Also, it is confirmed by experimental data that the constitution of the present invention defined by TREF is reasonable.

For instance, since the production of component(B) was not carried out in the second step in Comparative Example 1, H(C)/H(A), W(A), W(B), and the like could not be defined, and flexibility and transparency were poor.

In Comparative Examples 2 and 3, W(A) and W(B) were outside the definition of the present invention. In Comparative Example 2, flexibility and transparency were poor since the amount of component(B) was less than the lower limit of the range. In Comparative Example 3, stickiness became poor and heat resistance was lowered since the amount of component(B) was more than the upper limit of the range.

In Comparative Example 4, flexibility was not sufficiently improved since [E]gap was too small and T(B) and H(C)/H(A) values were too high.

In Comparative Example 5, transparency was remarkably poor since tan δ did not have a single peak at 0° C. or lower (see FIG. 3), [E]gap was too large and a phase-separated structure was produced.

In Comparative Examples 6 to 7, T(A) value was high. In Comparative Example 6, flexibility and transparency were not sufficiently improved in spite of having a W(B) value with an organic peroxide of Comparative Example 9, stickiness and bleed-out were still unsatisfactory and smell was bad.

By comparing with the copolymers of Comparative Examples 8 to 10 obtained by a Ziegler-Natta catalyst, it is proved that the use of a metallocene catalyst is essential in the present invention.

Also, by using a specific propylene-ethylene random block copolymer of the present invention as a surface layer of a polyolefin based biaxially oriented multi-layer film, it is substantiated that the following properties of the film is highly improved, i.e., heat sealing strength, low temperature heat sealing property, transparency, appearance, anti-blocking property and slippery property.

For instance, a heat sealing strength was poor in Comparative Example 11 since the second step of sequential polymerization was not carried out.

In Comparative Example 12, a heat sealing strength is poor since the amount of the component(A) was too high.

In Comparative Example 13, an anti-blocking property was very poor since the amount of the component(B) was too high.

In Comparative Example 14, a heat sealing strength was poor since [E]gap was too small.

In Comparative Example 15, a heat sealing strength and a transparency were poor since [E]gap was too large and the tan δ curve did not show a single peak at 0° C. or lower.

In Comparative Example 16, a heat sealing temperature was too high since [E]A was too low and T(A) was too high.

In Comparative Example 17, a heat sealing temperature was too high, a transparency was poor. In addition, an appearance was poor due to the presence of FE since the polymerization was carried out by a Ziegler-Natta catalyst in place of a metallocene catalyst.

It was proved by Examples 15 to 20 that a heat sealing strength was, unexpectedly, remarkably increased by increasing a surface layer thickness as compared with conventional one. In Comparative Examples 11 and 18 employing a propylene-ethylene random copolymer, a heat sealing strength was not satisfactory and a heat sealing strength was not sufficiently increased even when a surface layer thickness was increased.

In Comparative Examples 19 and 20 employing a random copolymer and elastomer composition for a surface layer, it took phase-separated structure, therefore a heat is sealing strength was poor and a transparency was also poor. The heat sealing strength was not sufficiently increased even when a surface layer thickness was increased. This is because the peeling at the interface between matrix and domain occurs easily.

In Comparative Examples 21 and 22, a tan δ curve did not show a single peak. When using such a random block copolymer as a surface layer, a transparency was poor and the heat sealing strength was not sufficiently increased even when a surface layer thickness was increased. This is because the peeling at the interface between matrix and domain occurs easily.

The entire disclosures of Japanese Patent Application No. 2003-371458 filed on Oct. 31, 2003 and Japanese Patent Application No. 2004-124498 filed on Apr. 20, 2004 including specifications, claims, drawings and summaries are incorporated herein by reference in their entireties.

What is claimed is:

1. A polyolefin based biaxially oriented multi-layer film having at least one surface layer comprising a propylene-ethylene random block copolymer;
the propylene-ethylene random block copolymer obtained through sequential polymerization catalyzed by a metallocene component comprising 30 to 70 wt % of a propylene-ethylene random copolymer component (A) having an ethylene content of 1 to 7 wt % produced in the first step of the polymerization and 70 to 30 wt % of a low crystalline or an amorphous propylene-ethylene random copolymer component (B) produced in the second step of the polymerization having an ethylene content of 6 to 13 wt % higher than that of the polymer component obtained in the first step, wherein the propylene-ethylene random block copolymer shows a single peak at 0° C. or lower in the temperature-loss tangent (tan δ) curve obtained by dynamic mechanical analysis (DMA).

2. The polyolefin based biaxially oriented multi-layer film according to claim 1, which has a base layer which comprises a crystalline propylene based polymer.

3. The polyolefin based biaxially oriented multi-layer film according to claim 1, wherein the surface layer is comprised of 100 parts by weight of the propylene-ethylene random block copolymer and from 5 to 45 parts by weight of a crystalline butene-1 based polymer or propylene-butene-1 copolymer.

4. The polyolefin based biaxially oriented multi-layer film according to claim 1, wherein the propylene-ethylene random block copolymer satisfies the following condition (i):
(i) in a temperature-differential fractionation (dwt %/dT) curve obtained by a temperature rising elution fractionation (TREF) using an o-dichlorobenzene solvent in a temperature range of −15 to 140° C., a peak temperature T(A) is observed within a range of 65 to 96° C. and a peak temperature T(B) is observed within a range of at most 45° C. or a peak T(B) is not observed, and a temperature T(D) at which 99 wt % of total amount of block copolymer is eluted is at most 98° C., and a temperature difference T(D)−T(A) is at most 5° C.

5. The polyolefin based biaxially oriented multi-layer film according to claim 4, wherein T(A) is within a range of 65 to 88° C., T(B) is within a range of at most 40° C. or T(B) is not observed, and T(D) is at most 90° C.

6. The polyolefin based biaxially oriented multi-layer film according to claim 4, wherein the propylene-ethylene random block copolymer satisfies the following condition (ii):
(ii) a H(C)/H(A) ratio of an elution height H(C) at T(C) (={T(A)+T(B)}/2 is the middle temperature of the peak temperature T(A) and the peak temperature T(B) (when T(B) is not observed in a measurement temperature range, T(B) is defined as −15° C. which is the lower limit of measurement temperature)) to an elution height H(A) at T(A) is at most 0.1 in the temperature-differential fractionation curve obtained by TREF.

7. The polyolefin based biaxially oriented multi-layer film according to claim 4, wherein the propylene-ethylene random block copolymer satisfies the following condition (iii):
(iii) a weight average molecular weight (Mw) measured by gel permeation chromatography (GPC) is in a range of 100,000 to 400,000, and W(M<5000) which is defined as an amount of a component having a molecular weight less than 5,000 in GPC is at most 0.8 wt % to the total amount.

8. The polyolefin based biaxially oriented multi-layer film according to claim 1, wherein component (A) is crystalline.

9. A propylene-ethylene random block copolymer obtained through sequential polymerization catalyzed by a metallocene component, which comprises a crystalline propylene-ethylene random copolymer component (A) that shows a peak at temperature T(A) in a range of 65 to 88° C. and a low crystalline or an amorphous propylene-ethylene random copolymer component (B) that shows a peak at temperature T(B) in a range of at most 40° C. or does not show a peak in a temperature-differential fractionation (dwt %/dT) curve obtained by a temperature rising elution fractionation (TREF) using an o-dichlorobenzene solvent in a temperature range of −15 to 140° C., and the propylene-ethylene random block copolymer satisfying the following conditions (iv) to (vi):
(iv) A cumulative elution amount W(B) eluted below a middle temperature T(C) (={T(A)+T(B)}/2) of the peak temperature T(A) and the peak temperature T(B) (when T(B) is not observed in a measurement temperature range, T(B) is defined as −15° C. which is the lower limit of measurement temperature) in a temperature-differential fractionation curve obtained by TREF is from 30 to 70 wt %, and a cumulative elution amount W(A) eluted above T(C) is from 70 to 30 wt %,
(v) a temperature T(D) at which 99 wt % of total amount of block copolymer is eluted in TREF is at most 90° C., and
(vi) in a temperature-loss tangent (tan δ) curve obtained by dynamic mechanical Analysis (DMA) shows a single peak at 0° C. or lower, and
wherein [E]gap (=[E]B−[E]A) which is the difference between an ethylene content [E]B in a low crystalline or an amorphous propylene-ethylene random copolymer component(B) and an ethylene content [E]A in a crystalline propylene-ethylene random copolymer component(A) is in a range of 6 to 1 wt %.

10. The propylene-ethylene random block copolymer according to claim 9, wherein the propylene-ethylene random block copolymer satisfies the following condition (vii):

(ii) a H(C)/H(A) ratio is at most 0.1 in temperature-differential fractionation curve obtained by TREF.

11. The propylene-ethylene random block copolymer according to claim 9, wherein the propylene-ethylene random block copolymer satisfies the following condition (viii):

(viii) a weight average molecular weight (Mw) measured by gel permeation chromatography (GPC) is in a range of 100,000 to 400,000, and W(M<5000) which is defined as an amount of a component having a molecular weight less than 5,000 in GPC is at most 0.8 wt % to the total amount.

12. The propylene-ethylene random block copolymer according to claim 9, wherein the propylene-ethylene random block copolymer satisfies the following condition (ix):

(ix) a cold xylene solubility at 23° C. has an intrinsic viscosity $[\eta]cxs$ measured in decalin at 135° C. in a range of 1 to 2 dl/g.

13. The propylene-ethylene random block copolymer according to claim 9, wherein the propylene-ethylene random block copolymer satisfies the following condition (x):

(x) a melting temperature (Tm) obtained by differential scanning calorimeter (DSC) is in a range of 105 to 140° C.

\* \* \* \* \*